Lock Unit.

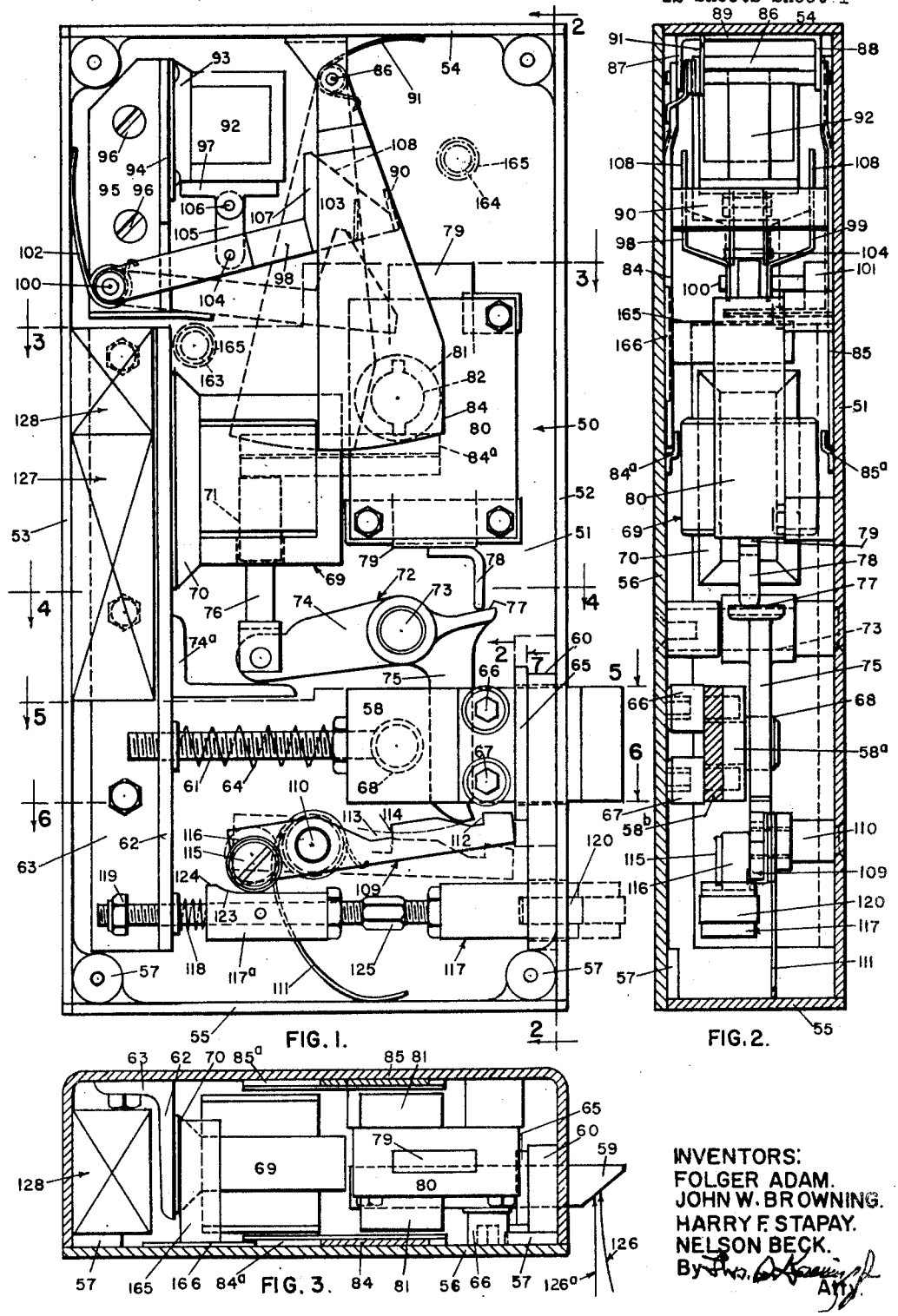

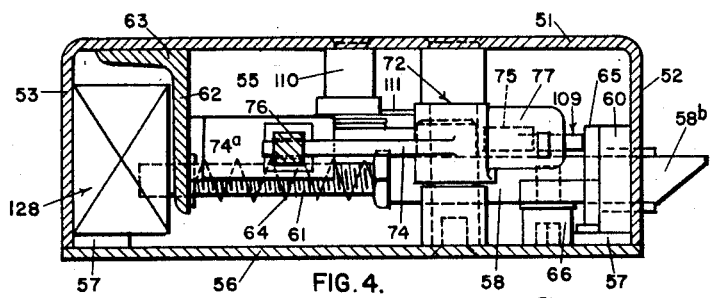
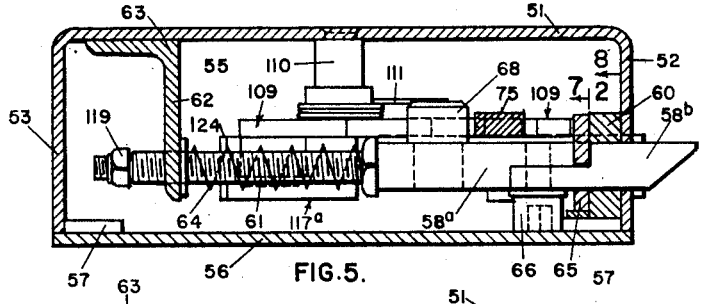
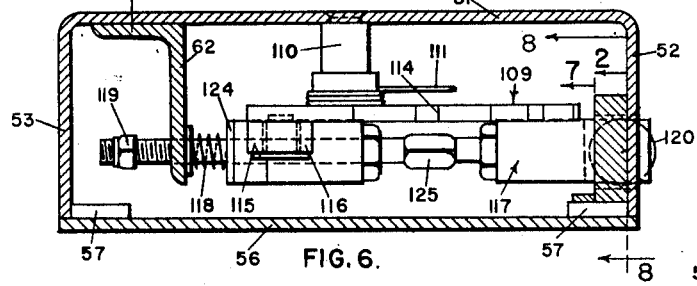
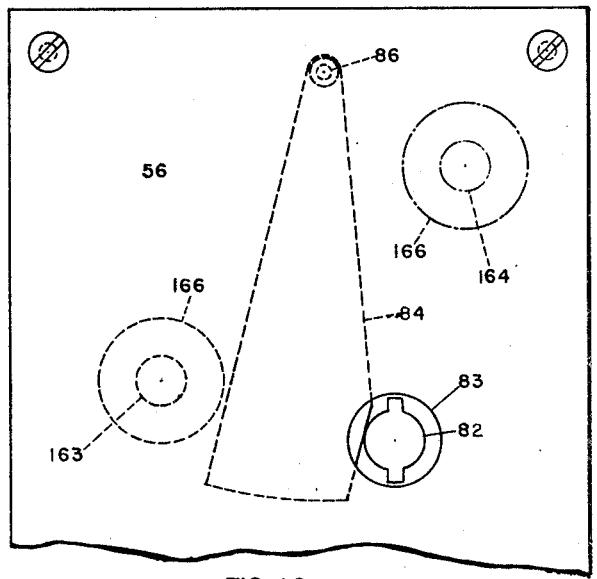
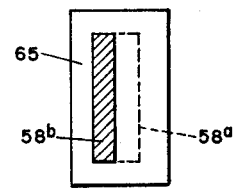
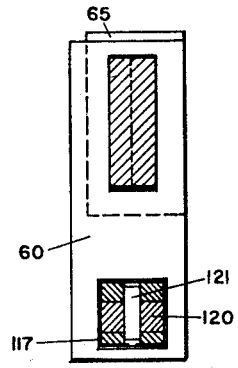
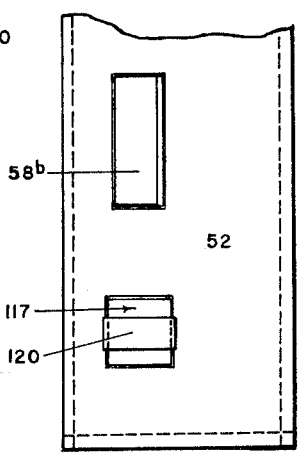

July 28, 1964     F. ADAM ETAL     3,142,166
LOCK CONTROLS AND THE LIKE
Filed Jan. 20, 1960     12 Sheets-Sheet 4
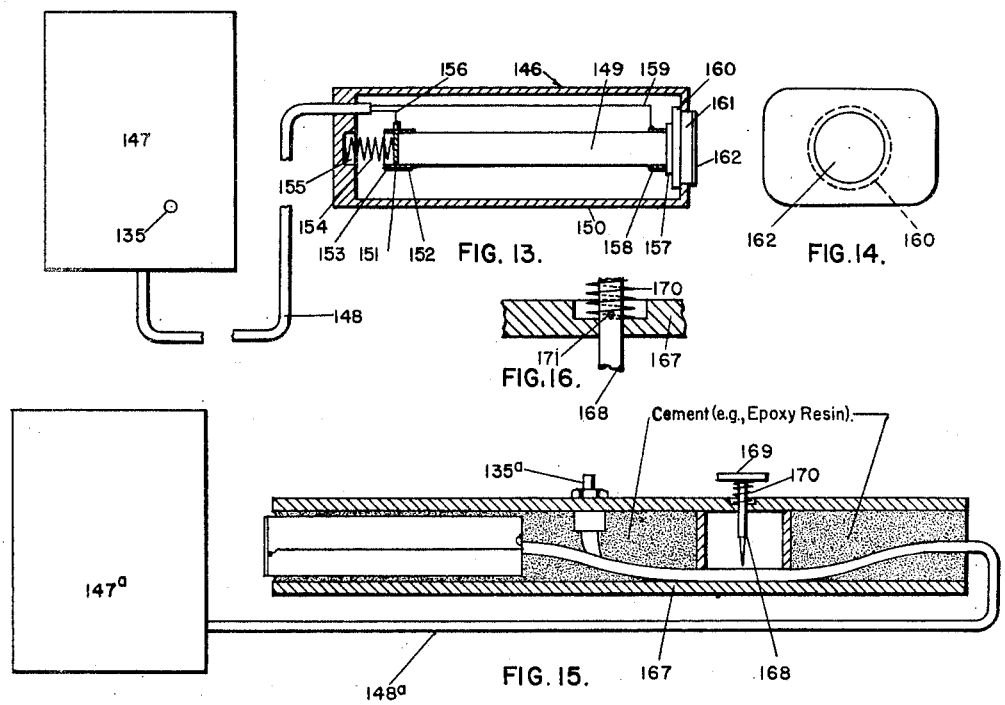
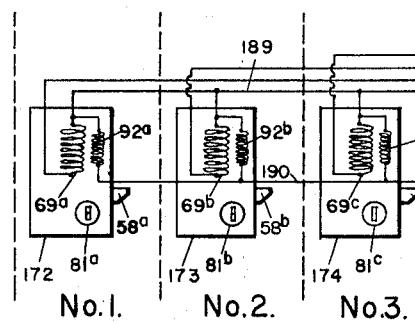
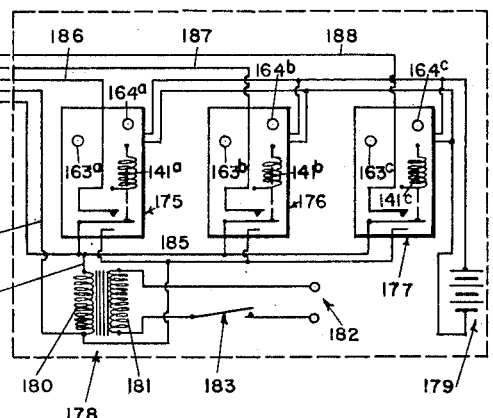
INVENTORS:
FOLGER ADAM.
JOHN W. BROWNING.
HARRY F. STAPAY.
NELSON BECK.
By
Atty.

July 28, 1964 F. ADAM ETAL 3,142,166
LOCK CONTROLS AND THE LIKE
Filed Jan. 20, 1960 12 Sheets-Sheet 5

INVENTORS:
FOLGER ADAM.
JOHN W. BROWNING.
HARRY F. STAPAY.
NELSON BECK.
By
Atty

July 28, 1964  F. ADAM ETAL  3,142,166
LOCK CONTROLS AND THE LIKE
Filed Jan. 20, 1960  12 Sheets-Sheet 7

INVENTORS:
FOLGER ADAM.
JOHN W. BROWNING.
HARRY F. STAPAY.
NELSON BECK.
By
Atty.

July 28, 1964   F. ADAM ETAL   3,142,166
LOCK CONTROLS AND THE LIKE
Filed Jan. 20, 1960   12 Sheets-Sheet 8

INVENTORS:
FOLGER ADAM.
JOHN W. BROWNING.
HARRY F. STAPAY.
NELSON BECK.
By
   Atty.

INVENTORS:
FOLGER ADAM.
JOHN W. BROWNING.
HARRY F. STAPAY.
NELSON BECK.

INVENTORS:
FOLGER ADAM.
JOHN W. BROWNING.
HARRY F. STAPAY.
NELSON BECK.
By
Atty.

INVENTORS:
FOLGER ADAM.
JOHN W. BROWNING
HARRY F. STAPAY.
NELSON BECK.
By
Atty.

July 28, 1964 F. ADAM ETAL 3,142,166
LOCK CONTROLS AND THE LIKE
Filed Jan. 20, 1960 12 Sheets-Sheet 12

INVENTORS:
FOLGER ADAM.
JOHN W. BROWNING.
HARRY F. STAPAY.
NELSON BECK.
By ........ Atty.

3,142,166
LOCK CONTROLS AND THE LIKE
Folger Adam, John W. Browning, Harry F. Stapay, and Nelson Beck, all of Joliet, Ill.; said Stapay and said Beck assignors to Folger Adam, a co-partnership
Filed Jan. 20, 1960, Ser. No. 3,662
40 Claims. (Cl. 70—279)

This invention relates to lock controls, and the like. The control operations hereinafter specifically disclosed, and the means to effect such operations, relate to unlocking of the locks; but it will presently appear that such operations, within the purview of the invention, may also be used in connection with locking operations as well as unlocking operations. Conveniently the locks embodyin the said features, and as hereinafter disclosed, are of the snap-locking type in which the closing of the door or other like element produces the locking operation by a conventional snap-locking movement; but we do not intend to limit ourselves to the combination of our present improvements with snap-locking units, except as we may do so in the claims to follow. It is also to be noted that although we have illustrated and shall describe embodiments in which the features of our invention are specifically designed for locks of that type which may be conveniently applied to swinging or hinged doors, said features may also be used with equal convenience and facility in connection with locks for sliding or endwise movable doors. Accordingly, we do not intend to limit said features to combinations intended for use with such swinging type doors, except as we may do so in the claims to follow.

At this point it is mentioned that a prime object of the invention is to provide a novel lock controlling improvement which is well adapted to use in connection with locking units for what may be called "security" installations—that is, such installations as are required for jails, prisons, and other places of confinement. The improvements hereinafter disclosed are well adapted for such installations as just above defined, and the following comments are pertinent in this connection:

We have provided in the lock elements which produce or control the unlocking operation, means which is responsive to a frequency of specified value (either specifically, or as contained within a band spread of known limits), together with key means adapted to produce such specified frequency or band spread under conditions such that the unlocking elements will respond to such frequency or band spread to produce the intended unlocking operation. As will presently appear, we may, as a further feature, so arrange the responsive elements that two or more such frequencies or band spreads must be simultaneously activated in the responding elements to produce the intended unlocking operation, neither one of them alone, or, in the case of provision for more than two such frequencies or band spreads, the activation of any group of them less than the entire number of such frequencies or band spreads will be insufficient to complete the unlocking operation. Thus the unlocking operation will be produced only when (under normally intended operation) all of the pre-determined or pre-selected frequencies or band spreads are simultaneously applied to the responsive elements for production of the desired unlocking operation. The frequencies or band spreads desirable for such operations, and the manner of production of such frequencies and/or band spreads will be fully explained hereinafter. We shall also hereinafter describe various arrangements for producing response in the unlocking elements to reception of the intended frequency or frequencies, only, thus ensuring that unlocking response will not be produced by improper frequencies which may reach the responding elements of the unlocking devices of the locking unit.

It is thus a prime object of the invention to provide for each of the locking units (for a door or confinement area) a pre-determined or pre-selected frequency or band spread which is individual to such door or area, or to provide a group of two or more such pre-determined or pre-selected frequencies for such door or area, individual to such door or area; and under the condition that, when a number of doors or areas are to be individually served, the frequencies or band spreads for the several doors or areas shall be so selected that the production of the proper frequency or band spread for any selected locking unit shall produce response only of such specific door or area's locking unit, thus ensuring that no locking unit other than that intended to be unlocked shall respond to an emitted signal.

In the foregoing statements we have used the term "frequency" or "frequencies" in the broad meaning of a time controlled series or group of signals emitted by the "key" or emitting element, and to which signals, thus timed, the responding elements of only a selected or specified locking unit shall make response. Such a timed series of signals, or such "frequency" may consist of a continuously emitted series at a selected frequency, or may consist of a series of pulses, properly timed to effect response to a receiving unit of a specified locking unit only, not producing response to any of the responding elements of the other locking units of a group of such locking units. We shall hereinafter illustrate and describe responding units capable of responding only to pre-selected or predetermined "frequencies" of both such broad categories above referred to.

It is now noted that when the circuitry of the responding element of the locking unit is sensitive to very closely pre-determined frequency impressions, the "key" or emitting element must also be capable of emitting correspondingly closely determined frequencies the same as the responding frequencies of the unlocking elements to be served. By thus making the receiving elements sensitive to closely confined frequencies, or to what is in effect a single frequency, it is necessary to use a "key" element of correspondingly closely controlled frequency emitting capability in order to produce the intended response to the specified locking unit, only. Thus, for various reasons it is desirable to use circuitry capable of producing such closely confined frequency operations. However, in practice it may be found desirable to use frequency emitting elements which may change frequency slightly, such slight changes being produced, for example, by temperature changes naturally to be encountered at the location of the lock installation, and where the "key" unit is used. Accordingly, it may sometimes be desirable to use a circuitry in the responding element of the unlocking mechanism which is responsive to a narrow band spread of received frequencies. Thus we have previously used the alternative term "band spread" in our explanations; but in any case it is desirable to use as narrow a band spread as is practically usable under the conditions of installation and usage to be encountered in actual practice, to ensure dependable operation and response to the emitted signals for the unlocking operation. When the pulse system of emission is used, together with suitable responding circuitry in the unlocking elements of the lock unit, such pulses may comprise short intervals of emission of the frequency to which the circuitries of the key unit and of the locking unit, are tuned.

Another important object of the invention is to provide emitting and receiving elements which shall operate on frequencies which are not readily detectable or determinable by an unauthorized person seeking to break the "code" of the signals needed for actuation of a specified locking unit. Since the low frequencies within the audible range are readily determinable, either by familiarity of the tone or by use of a simple element such as a tuning fork, and for various other reasons it is desirable to use a frequency, or frequencies for the numerous locking units comprising such an installation as that of a jail, well above such audible range. The range which is audible to human beings is generally accepted as between 40 and 18,000 c.p.s. As the frequency is raised the attenuation rapidly increases, so that the strength of the response produced at a given point of signal reception rapidly falls as the frequency is raised, assuming power output is not proportionately increased with such frequency increase. Practical considerations thus make it desirable to use frequencies generally within the range between substantially 20,000 and 150,000 c.p.s. Frequencies of the order of 50,000, with use of a range of sufficient band width to accommodate the numerous frequencies needed to activate a considerable number of different locking units (say 40–100) without overlap of the successive frequencies selected for various locking devices, will be found acceptable for various installations; it being understood that while it might be impractical to tune the frequency assigned to each locking unit exactly to a specified frequency, still, with such a range as, say from 40,000 to 60,000 many locking units could be accommodated by use of narrow band spreads, such band spreads being still sufficient to take care of practical tolerances of manufacture, frequency changes due to changes of temperature, and other necessary provisions. Thus, for the range suggested, between 40,000 and 60,000, 100 locking devices could be accommodated, allowing 200 c.p.s. band width for each such locking unit. By making provision for emission of two or more frequencies, simultaneously, for key operation corresponding to each selected locking unit, with correspondingly tuned elements in the receiving circuitry of the corresponding locking unit, and using various combinations of a plurality of such emitted frequencies for each locking unit, a very large number of locking units may be accommodated within such range as suggested above, and with ample space between successive band widths to avoid overlap or interference.

When incorporating the features of the present invention into locking equipment for places of secure confinement, such as jails, prisons, and the like, it is highly important that there be assurance that the responding elements of the locking unit shall respond only to key signals of exactly the frequency or frequencies to which the locking elements are tuned. Accordingly, a very narrow band spread must be adhered to, both in the signal receiving elements of the locking unit and in the signal emitting elements of the key unit used to produce unlocking. It is also highly desirable that the wave generator and the wave receiver and detector both be of a kind which shall have a high amplitude of wave generation and response at exactly the predetermined frequency for the locking unit in question. That is, it is highly desirable that departure from the resonant frequency of the wave generator (the key unit) shall be at the peak of a curve of amplitude variation vs. frequency which peak is very sharp so that slight variations of frequency from the intended operational frequency shall result in large reductions of amplitude. A like condition is desirable in the case of the frequency detector used in the responding equipment contained in the locking unit. Under these conditions only a key element intended for the unlocking of the particular locking unit in question will produce a sufficient response in such particular locking unit to ensure unlocking thereof. Thus assurance will be provided against unlocking of such locking unit by use of an unauthorized key element, unless such unauthorized key unit should perchance be capable of producing its emitted frequency on exacly the right c.p.s. The probability of producing unlocking action by unauthorized key units will thus be greatly reduced. When two or more frequencies are required, simultaneously generated and transmitted to the proper receiving elements of the locking unit, it is evident that the probability of producing an unauthorized unlocking operation by spurious key equpipment is magnified many-fold, so that a highly safe system of lock control is possible.

Various forms of crystal generators are possessed of qualities highly desirable to meet the conditions outlined above when used in the circuitry of the unlocking elements of the locking unit, and when used for the generation of the necessary corresponding frequencies to activate the unlocking elements of such particular locking unit. When such a crystal is used in the key unit to generate the predetermined frequency, it is possible to thus generate very considerable amplitudes of physical vibration of the free end of such crystal by application to the crystal of an electric wave of frequency equal to the fundamental frequency of the crystal as determined by its geometry and size. It is also found that such crystal vibrations will adhere in frequency to such fundamental value even when the impressed electrical wave frequency departs slightly from such crystal fundamental frequency. Accordingly, such a type of physical vibration key unit is well adapted for use to produce a physical vibration of the desired high super-audio frequency. It is also known that when such crystals are vibrated or quickly distorted high potentials may be developed, such potentials being in the form of shocks of frequency corresponding to the frequency at which the crystal is thus distorted. When such shocks are thus developed by a suitable crystal comprising a portion of the detecting or responding elements of the unlocking elements of the locking unit such unlocking elements may be caused to function, producing the desired unlocking operations. By making the crystal of the locking unit of the same geometry and dimensions as corresponding factors of the generating crystal of the key unit it is evident that when the frequency generated by the vibrations of the key unit is transmitted to the crystal of the locking unit, such locking unit crystal will respond at its natural frequency, and will thus develop a maximum value of the electric shocks referred to above, and at the frequency of such shocks corresponding to the natural frequency of the crystal of the key unit which key unit crystal originated the frequency thus finally produced in the locking unit crystal. By suitable circuitry in the locking unit the so-developed shocks thus produced by the key unit crystal will be amplified and used to control delivery of current to suitable elements of the locking unit to produce the intended unlocking operations. Various embodiments of the key unit and of the responding unlocking control unit will be hereinafter disclosed.

At this point it is explained that, in its broad aspect or definition our inventive feature thus far explained contemplates the provision of a response element in the lock unit, responsive to vibrations of frequency or code form of definite predetermination, and non-responsive to vibrations of frequency or code form other than such predetermined functions, together with key means to generate matched signals of corresponding frequency or code form at the instigation of the authorized person or persons, and to deliver such so-generated matched signals to the response element of the locking unit under conditions such that such response element will respond thereto, and initiate or produce the intended unlocking operation. We have referred specifically to the use of crystals for detecting receipt of the intended frequency or code form, and also to the use of crystals for generating such predetermined frequency or code form under the necessary conditions to enable production of the intended response. At this point, however, we call attention to the fact that we do not, by reference to and illustration of such crystal arrangements, intend to limit the scope or protection of our present improvements to inclusion of such crystal embodiments, except as we may do so in the claims to follow. Thus, by way of illustration, we also contemplate the inclusion and use of such other frequency or code producing and/or detecting means as magnetostrict bars, tuning bars, tuning forks, microphones, and other elements capable of producing closely predetermined frequencies or coded signals, and capable of detecting arrival of such predetermined or coded signals, both, within close tolerances of departure from the prescribed frequency or code form, so that there will be dependable assurance that responses of the detecting elements of the lock unit will occur only upon the arrival of signals to which such detecting elements have been tuned or coded. Thereby, there will also be produced dependable assurance that improper or unauthorized unlocking operations may not be produced; provided only that the frequencies or code combinations to which the responses will occur are known only to authorities properly authorized to have such knowledge, and that key units capable of producing and emitting the predetermined frequencies or coded signals are available and usable under the proper manner of use to produce the necessary responses by the elements of the lock unit.

We contemplate as being within the scope of our invention arrangements in which the frequencies or coded signals are transmitted to the unlocking elements of the lock unit either by direct physical contact of an element or part of the "key" or signal emitting unit with a proper part of the responding unit of the lock unit in question, so that the vibrations emitted by such key unit are thus delivered to such responding element under the conditions existing in the transmission of such frequencies or signals through solid media; or without such direct physical contact between an element or part of the key unit with a corresponding proper part of the responding unit. In such latter case, for example, the frequencies or signals might be transmitted through the intervening body of air between the key unit and the receiving unit. It is, however, here noted that there are various substantial advantages available when the direct physical engagement type of embodiment is used, which advantages are not present when such direct physical engagement does not occur, or, if present, are not present in nearly the same degree, or to a substantially less advantage, than when the direct physical engagement condition is present. One such condition affecting the desirability of the use of the direct physical engagement embodiment is that, due to its very nature the air as a conducting medium between the key unit emitted signals and the responding element of the lock unit, produces a highly attenuated condition of the received signal, so that the amplitudes available for translation by the circuitry of the lock unit into the unlocking operation, must be substantially amplified, and to a much greater degree of such amplification than is needed in the case of the direct physical engagement embodiment.

A further important advantage in the use of the direct physical engagement embodiment as compared to such an "air transmission embodiment," is that in the latter case (air transmission) there is substantial dispersion of the waves emitted by the key unit so that such waves, or other improper waves, may and will reach the responding element of the lock unit, with corresponding improper or confused intermingling of the key emitted signals with other frequencies or signals not related to those emitted by the key unit and intended for reception and translation by the elements of the unlocking unit. A further and important operating condition present in the case of the direct physical engagement embodiment to a high degree, and not present at all, or to only a minor degree in the case of the air transmission embodiment, is as follows:

At the super-audio or ultra-sonic frequencies such as already mentioned herein, the waves of such frequencies travel in substantially direct straight paths through a solid medium such as steel or the like; and this condition is most highly present in the case of the harder metals. Furthermore, there is substantially no lateral dispersion of such high frequency waves as they travel through such hard media, so that the amplitudes of the wave fronts received at the back or receiving face of a wall or partition formed of such hard metal is substantially as great as the amplitudes of such waves imparted to the front or receiving faces of such wall or partition. Furthermore, the path of travel of such high frequency waves through such a hard body is substantially normal to the plane of the front or receiving face of the wall or partition. Thus, by attaching a receiving crystal to the back or receiving face of such wall or partition, with the end of such crystal in good facial engagement with the back surface of such wall or partition, a high degree of response of the crystal will be produced by wave vibrations developed at the front surface of such wall or partition. Then, by bringing the freely vibrating end of the crystal of the key element into good facial engagement with the front face of such wall or partition in direct alignment with the receiving crystal, the wave vibrations of such key unit will be delivered most effectively to the receiving crystal. Under these conditions, if the frequency of the waves thus delivered by the key unit crystal are the same as the natural period of vibration of the receiving crystal it is evident that such receiving crystal will be brought into responding vibration at its resonant frequency, and thus will immediately develop such vibrations of maximum amplitude corresponding to the amplitudes of the vibrations imposed by the key unit crystal. Such response vibrations will continue as long as the vibrations of the key crystal are continued under the intended condition of engagement of such key unit's crystal with the front face of the wall or partition.

Due to the high internal molecular resistance of the crystals to vibration, the vibrations of both the key unit and the responding unit will cease with a substantially dead-beat termination when the driving force which produces the vibrations of the key unit crystal cease. Thus it is possible to produce closely controlled signals by the key unit, with corresponding closely controlled responses by the unlocking elements and it is thus possible to ensure dependable and assured response of the unlocking elements only to signals conforming to the exact keyed frequency or coded form.

We have previously referred to the use of two or more frequencies, simultaneously applied to the unlocking and response elements of the lock in question, and acting conjointly to produce the necessary circuit element operations to effect unlocking. When such an arrangement is incorporated into the embodiment of our invention, it will generally be desirable to avoid the production of intermingling of the wave forms of the different frequencies, thus also avoiding the production of "beat notes" in the received responses. Due to the fact that the high frequencies used for the signals (being of the super-audio or ultra-sonic ranges) possess the quality of transmission through the hard media such as steels and the like, substantially without lateral dispersion, it is possible to bring two or more key crystal elements into direct engagement with proper responding locations of the lock unit, at which locations corresponding response crystals of the lock unit elements are attached to the wall or partition, and thus bring into operation responses of the lock unit crystals corresponding to the respective key unit crystals, without interferences occurring between the received crystal signals. Then such received signals may be translated in the circuitry of the unlocking element to produce the intended unlocking operations as a result of the combined signals thus imposed by the two-crystal or multi-crystal key unit.

Under the condition of reception of the vibrations developed by the key unit element the receiving element of the lock unit (for example, the crystal or crystals of such unit already referred to) will be caused to vibrate; and, assuming that the key unit is provided with vibrating elements matched to the vibration frequency or frequencies of the lock unit, such elements of the lock unit will promptly respond and commence and continue their vibrations as long as the key unit vibrations continue, it being assumed that the key unit is kept in proper physical engagement with the lock unit during such time. If the natural period of vibration of the lock unit crystal or crystals is or are exactly the same as the imposed vibrations frequency or frequencies, resonance will be produced in such responding crystal or crystals, with corresponding production of peak amplitudes in the responding vibrations. Any disparity between the frequency of the imposed vibrations and the natural period of vibration of the responding vibration will be reflected in a substantial reduction of the amplitudes of the responding vibrations, with corresponding reduction of the strengths of operations to be produced in the lock unit, instituted by such responding vibrations. By selection of crystals (or other vibration producing elements) in both the key unit and the lock unit, having sharp rises in the curves representing the amplitudes of vibrations of such crystals with change of frequency, and correspondingly sharp decreases in such curves for frequencies beyond the natural period of such crystals, it is possible to produce responses of great strength in the lock unit, while ensuring very close confinement of such high strength responses to a very narrow frequency band. Thus accuracy of response only to key signals intended to be responded to, together with great strength of the signals produced during such response, may be and is obtained by use of such equipment.

Generally, but not necessarily, it will be found desirable or necessary to amplify the shock signals produced by the responding element or elements (such as the crystals), in order to produce the necessary forces to produce unlocking of the latch or other lock element. We have herein illustrated and shall sufficiently describe several forms of such amplifying circuits, and have also illustrated and shall describe several forms and embodiments of the circuits which may be used in the key elements. In each case it is here noted, the circuitry associated with each crystal or other vibration producing or responding element should be of such structure that its natural period of oscillation matches that of the crystal or other vibrating element. Thus maximum response strengths will be produced in the lock unit's components, and maximum strengths of vibrations will be produced in the key unit. We have made provision for ensuring proper adjustments of the various forms of circuitry to ensure such matching conditions where necessary.

We have previously made reference to engagement of the proper portion of the key unit with a corresponding proper portion of the lock unit in order to transmit the super-audio or ultra-sonic vibrations to the receiving element, such as the receiving crystal. Such "proper portion of the lock unit" may be some location of the lock casing located at or adjacent to the door served by such locking unit; or it may be located at some point removed from the location of such door and the remainder of the lock unit, that is, at some point removed from the location of the locking element proper, such as the lock bolt. For example, such "proper portion of the lock unit" may be located at a control location, such as a control cabinet, where are located the "proper portions of numerous of the lock units." In such form of installation such "proper portion of the lock unit" for each such lock unit will be electrically connected to the solenoid or other element or elements of circuitry of such lock unit, generally contained directly within such lock unit case. Under such an arrangement there would be included at such control location or station or cabinet a panel or the like carrying the responding crystal or crystals for each of the controlled locks, together with such circuitry as needed to respond directly to the vibration shocks produced by such crystal or crystals, and possibly amplifying equipment and associated elements needed to condition the received signals for transmission to the lock unit proper, located at a distant point. A key unit would also be provided for each such "proper portion of the lock unit," each such key unit being matched to the natural frequency of the corresponding receiving crystal or crystals. Then, by bringing each of the key units for selected door locks into direct engagement with the corresponding "proper portions of the lock units" contained at such control station, the guard or other authorized person could remotely control the unlocking of selected doors without coming personally to the locations of such doors. We have hereinafter shown more or less schematically such a control station arrangement, and shall describe it in sufficient detail.

It is to be noted that since the responding crystal or other response vibrational element produces the vibrations in the proper element of the lock unit, which vibrations are then amplified, if necessary, to actuate the unlocking mechanisms, it might on occasion happen that a blow or other sharp impact delivered to the lock casing could institute a sudden vibration of such elements of sufficient amplitude to institute functioning of the circuitry of the lock unit, with production of unintended unlocking operation. Such an unintended vibration would be of short duration, but might serve to produce functioning of circuitry comprising a portion of the elements of the lock unit. To ensure against such an improper functioning of the unlocking equipment, and for other reasons, our responding equipment is constituted to function normally by a sustained vibration condition, or a series of successive and sustained vibration conditions, in the form of a code, to which coded vibrations our responding equipment may be keyed so that it will operatively respond only to incoming or supplied vibration conditions matching such predetermined coded key conditions of the lock responding elements. Under these conditions it will be necessary for the key unit which emits such signals to continue its vibrational operation long enough to assuredly institute functioning of the lock's unlocking elements; or when the lock unit includes circuitry or elements responsive only to coded signals the key unit should be provided with means to emit its physical vibrations to produce a series of coded signals properly matched to the responding circuitry of the lock unit, to produce unlocking response.

We have, in the foregoing statements defined certain of the characteristics of our invention which characteristics include the sensing element of the lock unit, the response of such sensing element to the predetermined frequencies, the sustaining of such received and sensed frequencies for a time interval sufficient to effect response of the unlocking elements of the lock unit, and, if desired, the inclusion of suitable code responsive elements in such lock unit's circuitry, and the inclusion of means whereby the elements of the lock shall respond only to the received signals when they are coded to correspond to the code requirements of the lock unit's elements. We have also frequently referred to the use of crystals as elements of the sensing equipment of the lock unit and have referred to the use of crystals as the physical vibration producing elements of the key unit. Such crystals are well adapted to meet the practical requirements of the sensing elements of the lock unit, and are also well adapted to meet the practical requirements of the physical vibration producing element of the key unit, to whose physical vibrations the physical vibration sensing element of the lock unit will respond. However, we do not intend to limit the protection to be afforded us by the present application and patent protection to be issued based thereon, to the use of such crystals for producing the vibrations of the key unit element, nor to the use of crystals for sensing the vibrations so produced by such key unit, with translation of such so sensed vibrations to produce the desired functioning of the elements of the lock unit, except as we may limit ourselves in the claims to follow. Accordingly, we contemplate as being within the scope of our present invention lock units including other forms of physical vibration sensing elements, having vibrational amplitudes of maximum value at natural base or fundamental resonance frequencies, and means to receive and translate physical vibrational signals of the frequency which produces such resonant vibrations of such lock unit sensing elements to cause desired lock functioning (either for locking or unlocking); and the combined use of key units including other forms of physical vibration producing elements, than said crystals, and having vibrational amplitudes of maximum value at natural base or fundamental resonance frequencies, and wherein said resonant vibrational frequencies of the key unit element are substantially the same as the resonant vibrational frequencies of the sensing element of the locking unit which is companion to such key unit; and wherein the resonant frequency amplitude of vibration of such key unit physical vibration producing element is directly transmitted through a physical vibration conducting body to the lock unit resonant frequency sensing element upon establishing physical solid body communication between the key unit physical vibration producing element and the lock unit physical vibration sensing element for lock unit functioning by the physical vibrations of said predetermined frequency and amplitude so produced in the lock unit by such key unit elements.

By the term "sustained" as above used we contemplate lock equipment which will respond only to vibrations of a preselected frequency. Furthermore, we contemplate that such responding equipment of the lock unit shall respond to such preselected frequency only when the vibrations of such frequency shall be sustained long enough to cause the lock's locking elements to perform their intended functions (either locking or unlocking) through the locking unit's circuitry.

Numerous arrangements may be provided to avoid improper functioning of the lock's locking elements, except when activated by vibrational signals responding to such specifications as defined above, or combinations of such specifications.

We have herein illustrated and shall describe several embodiments of the key unit, together with showings of circuitry to produce electrical vibrations of the vibration producing element of such key unit at frequency to match the natural periods or frequencies of the vibration sensing element (or elements) of the lock unit. Thus the key unit's vibration producing element shall be caused to vibrate at its natural frequency, and at maximum amplitude, as determined by its characteristics such as its geometry and size, with electrical impulses delivered to it in harmony with such natural period of its vibrations; and thus the vibration producing element will be caused to vibrate at its maximum amplitude to produce maximum operational effects on the "proper portion" of the lock unit when the key unit is physically applied to such "proper portion."

It is evident that a suitable source of current shall be provided in such key unit to activate the circuitry thereof. Also, that proper switching provision be included in such key unit to enable the authorized carrier of such unit to control the operation thereof. Such source of current for such key unit may conveniently comprise a small battery (either dry or wet) of sufficient delivered potential to actuate the circuitry; but such battery arrangement will of course only be operatively effective for the overall time limit of its deliverable current supply. Renewal thereof will then be necessary.

Instead of such portable battery arrangement it is also possible to make provision for plugging in a cord attached to the key unit, to a suitable current supply outlet located in proximity to each of the doors intended to be served by such equipment. However, we have also made provision for delivering to the key unit the necessary current for serving its electrical components and circuitry by another means, as follows:

When the lock unit itself is carried by a stationary element such as the door frame, suitable service connections may be permanently provided for supply of current to its circuitry. Such current is conventionally A.C. Thus a source of A.C. is available at the lock proper. It is then possible to provide means to supply to the circuitry of the key unit an A.C. potential by induction when such key unit is brought into physical engagement with the lock unit for the intended unlocking operation. Such induction effect may be produced by provision of a primary winding located in the lock unit conveniently near to the wall or partition against which the key crystal is engaged for the unlocking function; and by also providing a corresponding secondary winding in the key unit properly positioned with respect to the crystal of such key unit that when the key unit crystal is registered with the proper area or portion of the lock unit such secondary winding of the key unit will be properly registered with the primary winding contained within the lock unit's housing or casing. By so arranging the circuitry of the lock unit that such primary winding is continuously energized (as long as service current is being supplied) there will be assurance that upon bringing the key unit into its operative position with respect to the lock unit an ample supply of A.C. will be made available in the key unit to produce the intended functioning thereof as long as, and only as long as, such key unit is retained in its proper relation to the lock unit. Thus, too, such key unit is made inoperative when removed from the lock unit.

In connection with the foregoing, it is also noted that each key unit is matched to a particular lock unit, and is intended to activate only such particular lock unit to which it is thus matched. Thus, when the key unit is matched to the lock unit for the unlocking operation, the crystal element of the key unit must be located at a particular position against the surface of the lock unit casing. By locating the primary winding of the lock unit at a particular and secretly known position with respect to the responding crystal of such lock unit, it is evident that only a key unit having its secondary winding properly located with respect to its crystal element will be capable of registry of both its crystal and its secondary winding with the crystal and the primary winding of the intended lock unit. Any other key unit, not possessed of such physical characteristics would not produce simultaneously registry of both its crystal and its secondary winding with the proper elements of the lock unit.

Since the key unit for each particular lock unit must be applied to the "proper portion" of such lock unit (whether such portion be located directly at the location of the lock unit or elsewhere), it is necessary that the guard or other authorized person have such key unit in his possession at the time of unlocking the matching lock unit. If a prisoner should be able to gain possession of such key unit he could of course then unlock the matching lock unit. To make provision against any untoward use of the key unit thus purloined from the guard, we have made provision in the construction of such key unit to enable the guard or other authority to promptly disable such unit so that it cannot longer be used for its intended unlocking function. We have hereinafter illustrated and shall describe several embodiments of such key unit which can be readily rendered inoperative to an extent such that they can thereafter be again rendered usable only by considerable work performed on them or by such an extent of destruction as to render them permanently inoperative without complete reconstruction.

A further feature and object of our present invention is to provide an unlocking arrangement embodying the features of invention already referred to, as well as other features now to be explained. Accordingly, the following further brief statement is now in order:

It is evident that current must be available to produce functioning of the features of invention already referred to, insofar as said features depend on the use of current for their operations. It has also been mentioned that insofar as concerns the key unit the current therefor may be derived from a suitable battery, either dry or wet, carried by the guard or other authorized person using such key element; or such current for such key unit may be inductively produced as already stated. It is also possible, insofar as concerns the responding elements and circuitry of the lock unit to produce operation thereof by a self-contained battery arrangement; but in this case, when the actual unlocking energy is to be supplied electrically a battery of sufficient watt-hours capacity to produce numerous such unlocking operations would necessarily be of undesirable size; and it would probably be necessary to renew such a battery at inconvenient and uneconomical intervals. Accordingly, it is desirable to make provision for supply of the needed power current for actually operating the unlocking elements against suitable retracting springs, from a convenient source of current supply available, such as the conventional current outlet from a supply line. With such an arrangement the circuitry presently to be disclosed in sufficient detail serves to produce closure of proper switching elements to supply such power current to the unlocking solenoid or other equivalent element of the lock unit.

In case of failure of such conventional current supply it is evident that means must be provided for producing the unlocking operations manually, to enable release of doors under such emergency conditions. Accordingly, the lock unit herein disclosed and to which the herein disclosed key operational improvements have been adapted by way of illustration only, is provided with other manual key operational elements. These are of such arrangement that in case of failure of the power current supply, such conventional key operation by use of a conventional form of manual key elements at the location of the lock itself may be used to produce the unlocking operation. Thus, in any case when current is available such conventional key elements are rendered unusuable while the vibrational key form of unlocking equipment is usable; whereas in case of failure of the conventional current supply needed to effect such vibrational form of operation the conventional form of key operational equipment is rendered usable to produce the unlocking operations. Accordingly, we have included in the locking embodiments presently to be disclosed in detail, a form of conventional manual key operational equipment, rendered non-usuable when the current supply is available from any source, the vibration form of key operation then being usable; and which conventional manual key operational equipment is rendered usable when the current supply is discontinued for any reason, such discontinuance of current supply also rendering the vibrational form of key operation non-usable.

To illustrate means embodying the foregoing features we have, by way of illustration only, disclosed the following further features and operations; we have provided a shutter arrangement which may move between a normal position in which it interferes with introduction of the key into the conventional manual key opening to the manual key lock, and an emergency position in which such key interferes is discontinued so that the key opening is uncovered and made usable for reception of the conventional manual key. The arrangement is further such that as long as current is available and present from the conventional power supply such shutter is drawn into key opening covering or obscuring position, so that under these conditions (of normal conventional power supply) it is impossible to effect normal manual key unlocking at the location of the lock unit. We have then also provided for movement of such shutter to its other position (to uncover and make usable the conventional manual key opening) whenever the normal conventional power supply is interrupted, no matter what may be the cause of such interruption. Thus, at times when the herein disclosed special key operation improvements are rendered inoperative by reason of conventional power supply failure, it becomes immediately possible to unlock the lock unit by the conventional manual key operation. We shall hereinafter describe such embodiment including such provisions for controlling the operativeness of the manual key conventional operation, in sufficient detail.

We have previously referred to the use of circuitry responsive to frequencies within a narrow band spread. When such narrow band spread responsive circuitry is used in the lock unit for producing or controlling functioning of the lock element it is evident that the frequencies produced by the key unit and delivered to such lock unit may be effective when they lie within such narrow band spread. Accordingly, any slight variations in the frequency produced by the key unit due to such effects as change of temperature of the crystal thereof, when the crystal type of vibration is used, can be properly sensed and translated by such a narrow band spread receptive lock unit. It is also noted that the maximum amplitude of the vibrations produced by such key unit will occur when the frequency of the oscillator of the key unit is exactly the same as the natural frequency of the crystal which is generating the vibrations to effect lock functioning. Under such exactness of driving impulses produced by the oscillator of the key unit the maximum effect will thus be delivered to the lock unit's sensing elements. Therefore it is a further feature of our present invention that we have made provision for controlling the oscillator frequency delivered to the crystal of the key unit, by change of such oscillator frequency with change of temperature of the key unit, so that for considerable changes in temperature of such key unit the maximum driving effect will be produced by the circuitry of such key unit to ensure maximum amplitude of the vibrations of the crystal, and with maximum physical vibrational effect delivered to the sensing elements of the lock unit, through such a small range of frequencies of the key unit's crystal as may usually be expected to occur due to temperature changes of the key unit.

We have previously referred to the use of "coded" signals delivered in vibrational form to proper elements of the lock unit, so that the sensing and translating elements of the lock unit's circuitry must be sensitive only to, and shall translate only signals received according to such coding, in order to produce the intended lock operations. Such coded signals may comprise signals received by a single sensing element but of duration and/or code form, in order that they may be properly translated in the key unit's circuitry for intended operation thereof; or such coded signals may comprise signals delivered to and received by two or more sensing elements, with translating circuitry of proper characteristics to combine both or all of such so-received signals, to produce the intended lock unit's functioning. We have hereinafter shown and shall describe embodiments according to both such coding arrangements.

In connection with the foregoing we have also included in our disclosures, provision for purposely changing the timing of the received signals, including the durations of the pulses, when it is desired to change the code qualities to which the lock unit shall be responsive. Such changes may constitute "permanent" settings of the circuitry of the lock unit, to pre-selected code values or qualities, so that by changing such "settings" from time to time, it will become necessary to make corresponding changes in the frequencies or code values and/or qualities emitted by the key unit in order to produce intended functioning of the lock unit. The values and qualities of such settings may be held in secrecy by authorized persons, so that the difficulty of unauthorizedly producing intended functioning of the lock units may be correspondingly increased.

When the sensing elements of different lock units are responsive effectively to different physical vibrational frequencies individual to such lock units it is necessary that the physical vibrational frequencies delivered by key units to produce effective responses of such units must be capable of delivering to the different lock unit sensing elements physical vibrational frequencies to match the requirements of such different lock units. Accordingly, when such different frequency responsive elements are provided in the lock units of numerous cells of a cell block, for example, it is manifest that the authorized person tending such lock units must carry with him, or be provided with, key unit means to meet the requirements of all of such cell lock units. Such condition may be complied with by providing individual complete key units corresponding to the various lock units to be thus served. Alternatively, a single key unit may be provided which in itself includes means to adjust the physical vibrational frequency which it will deliver to the lock unit sensing element being served at any given time, so that by adjusting such key unit according to the requirements of such particular lock unit's sensing elements and circuitry, it becomes possible to use such single key unit for activating the elements of each of a number of lock units provided with the physical vibrational frequency features herein disclosed.

As a further alternative means to selectively activate the sensing and lock unit operation producing elements of such a number of different lock units, we have also herein shown and shall describe an arrangement wherein the sensing elements for a number of individual lock units (and, in some embodiments, also portions or all of the circuitry responding to such sensing elements) may be located at a common control stand or cabinet close to or removed to a distance from the cells whose locks are to be served. In such an arrangement key units individual to the numerous sensing elements for such lock units may be conveniently provided at such stand or cabinet, each such key unit being, if desired, permanently adjusted or produced to deliver its physical vibrational frequency and/or code signals to a corresponding one of the numerous sensing elements of such stand or cabinet.

We have also hereinafter illustrated and shall amply describe various forms of circuitry and circuit element uses in corresponding embodiments of lock units and key units, all embodying features of our present invention. Included in such showings are units incorporating transistors, vacuum tubes, and cold gas tubes, all by way of illustration and example.

Other features and objects of the invention are to provide a very compact lock unit embodying the features of our present invention, and thus to provide a lock unit which is substantially not larger or more difficult of installation than conventional forms of lock unit well known and widely used in the jail locking and analogous arts. In this connection we have also herein illustrated and shall describe one physical embodiment wherein the features of our present invention have been incorporated within one form of lock unit which is at present in wide use in said arts.

Other objects and uses of the invention will appear from a detailed description of the same, which consists in the features of construction and combinations of parts hereinafter described and claimed.

In the drawings:

FIGURE 1 shows a face view of one embodiment of lock unit incorporating the features of our present invention, the front cover plate having been removed to show the interior construction and physical elements of the lock unit, with the exception of the circuitry which is enclosed or housed in two containers located within the lock housing at a convenient space otherwise not occupied; and in this figure the lock latch is shown in its spring projected or locking position; and the door actuated release trigger which releases the latch for spring projection into its latching position when the door has been slightly opened is shown in its depressed position to which it is forced by the door when such door is closed, by full lines, and in its released or door opened position by dotted lines; and in this figure the proximate shutter is shown in its manual key interfering position by full lines and in its released or key non-interfering position by dotted lines (the shutter at the far side of the lock unit being in each case in corresponding position, when such far side shutter is provided); and in this figure the latch retracting solenoid is un-energized so that the bell-crank by which un-latching is produced is shown in its normal or non-operated position;

FIGURE 2 shows a vertical cross-section taken on the lines 2—2 of FIGURES 1, 5 and 6, looking in the directions of the arrows;

FIGURE 3 shows a horizontal cross-section taken on the line 3—3 of FIGURE 1, looking down;

FIGURE 4 shows a horizontal cross-section taken on the line 4—4 of FIGURE 1, looking down;

FIGURE 5 shows a horizontal cross-section taken on the line 5—5 of FIGURE 1, looking in the direction of the arrows; and it shows the two-part construction of the latch element, together with the plate which engages the trigger element, which plate is clamped between the two parts of the latch element;

FIGURE 6 shows a horizontal cross-section taken on the line 6—6 of FIGURE 1, looking in the direction of the arrows;

FIGURE 7 shows a detail cross-section taken on the lines 7—7 of FIGURES 1, 5 and 6, looking in the directions of the arrows;

FIGURE 8 shows a detail cross-section taken on the lines 8—8 of FIGURES 5 and 6, looking in the direction of the arrows; and it shows the journal bearing for the roller of the door actuated release bar;

FIGURE 9 shows a fragmentary edge view of the lower portion of the door casing; and it shows in particular the ends of the latch element and of the door actuated release trigger;

FIGURE 10 shows a fragmentary face view of the upper portion of the lock unit, including the exposed key opening of the manually key operated unlocking unit, the shutters being in their key opening exposing position, as when there is no current supply to the shutter holding solenoid, by which the shutters are held in key obstructing position, as shown in FIGURE 1;

Figure 11:
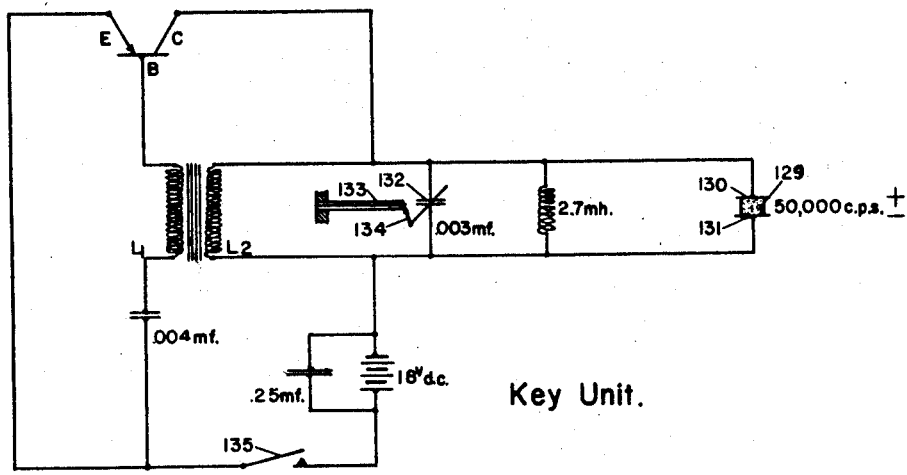
Figure 12:
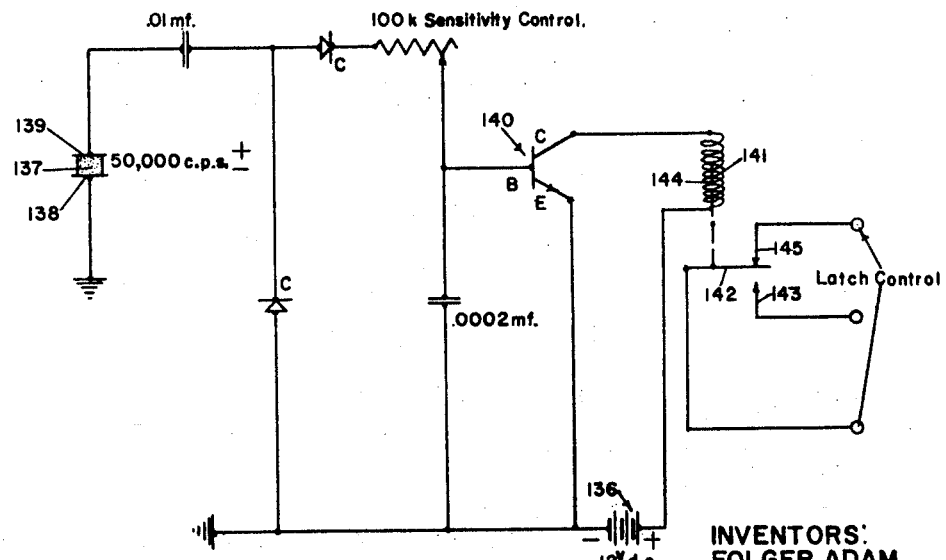
Figure 18:
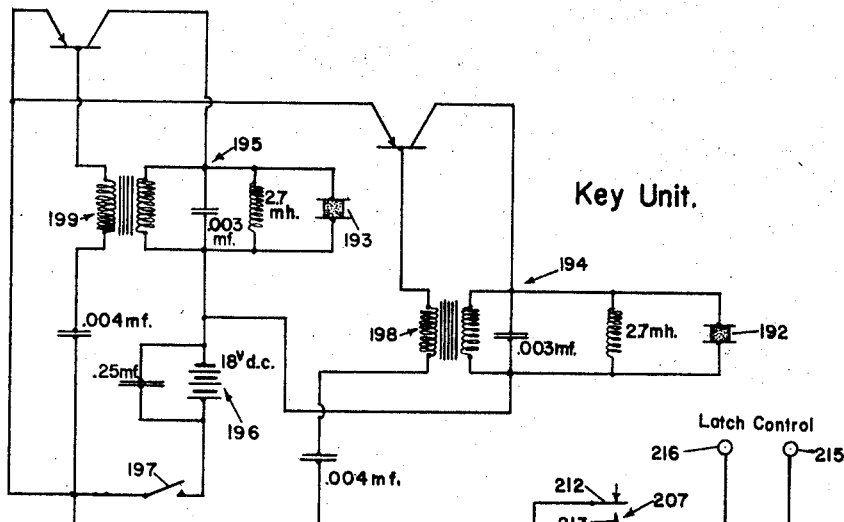
Figure 19:
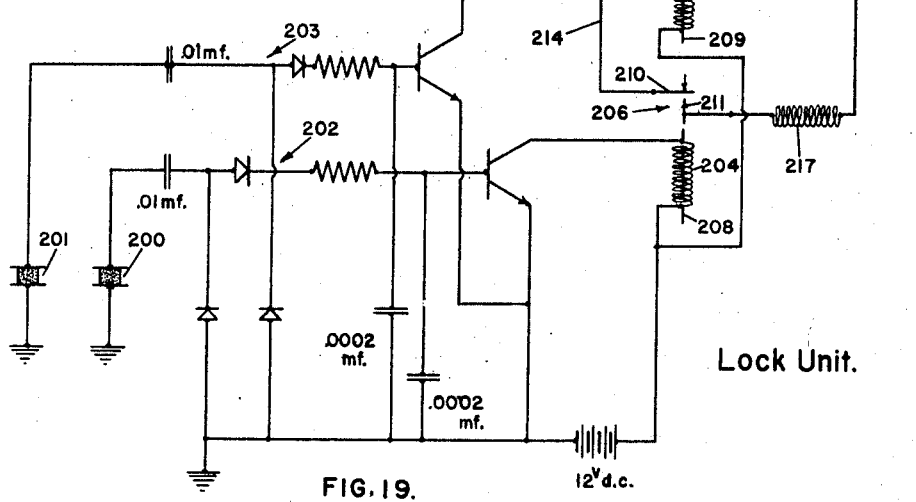
Figure 20:
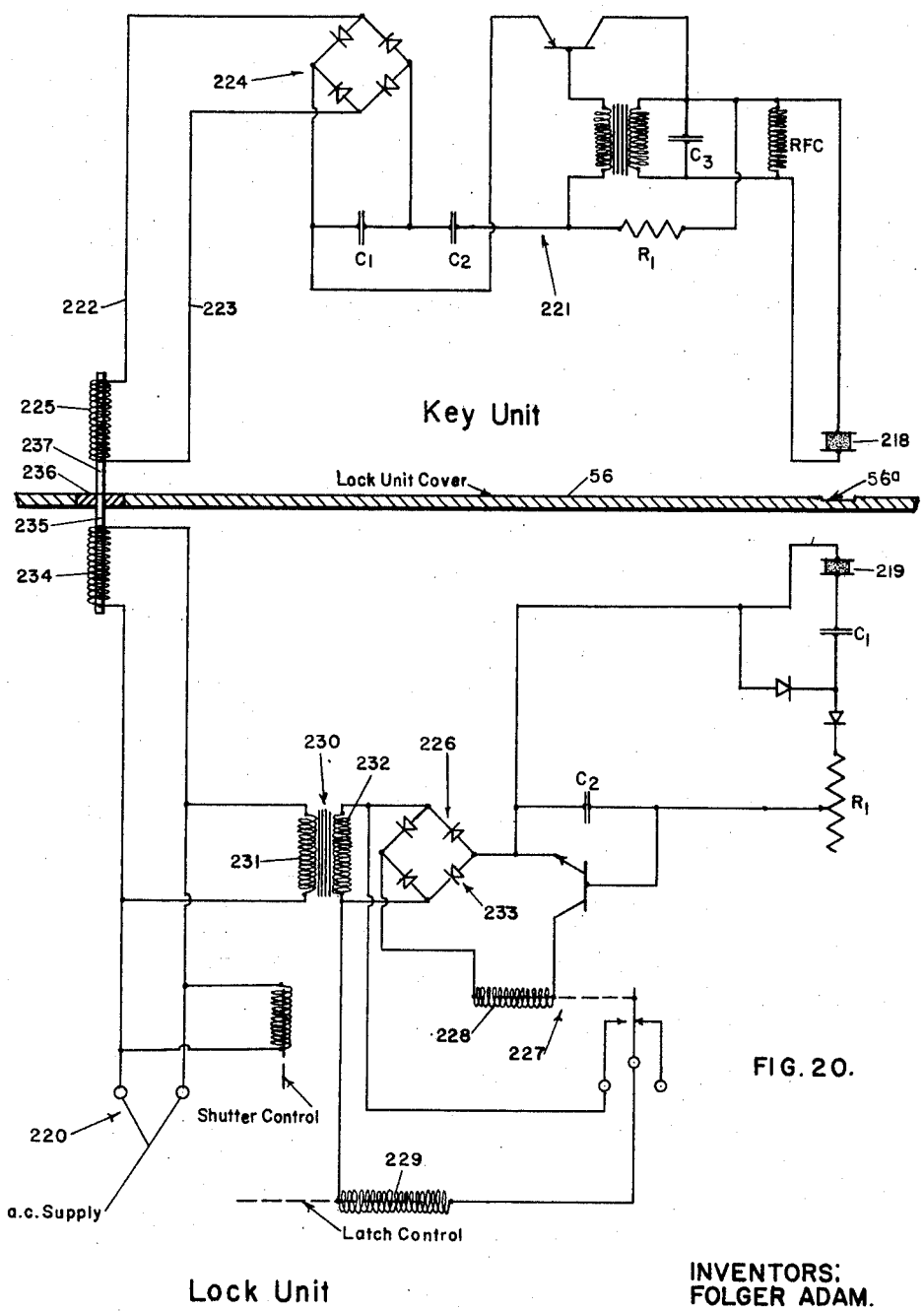
Figure 21:
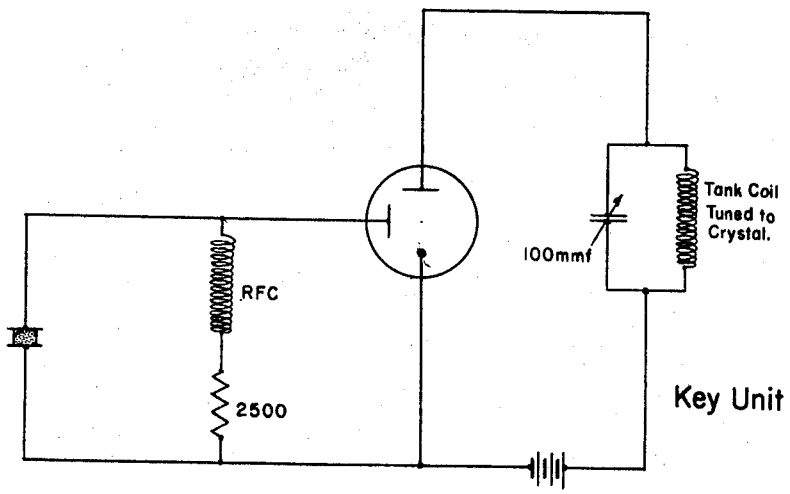
Figure 22:
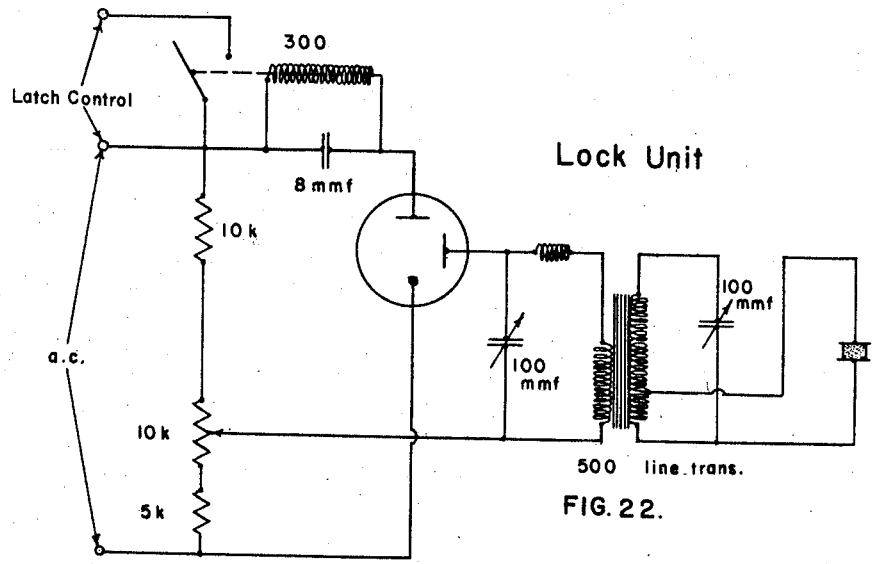
Figure 23:
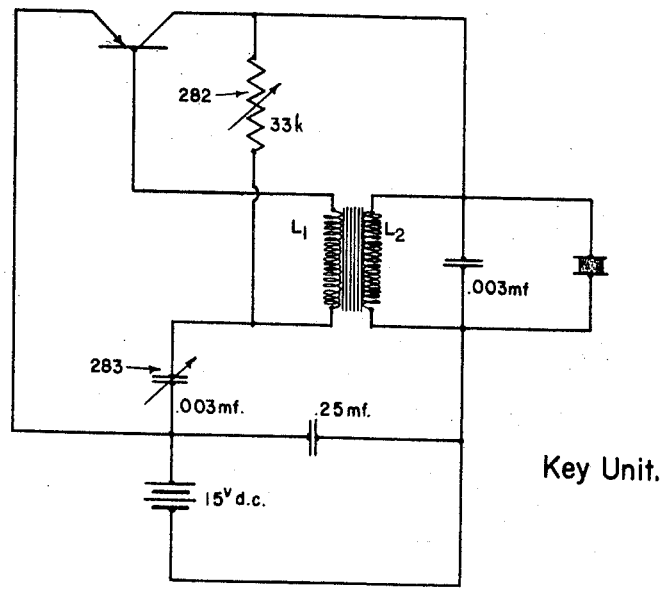
Figure 24:
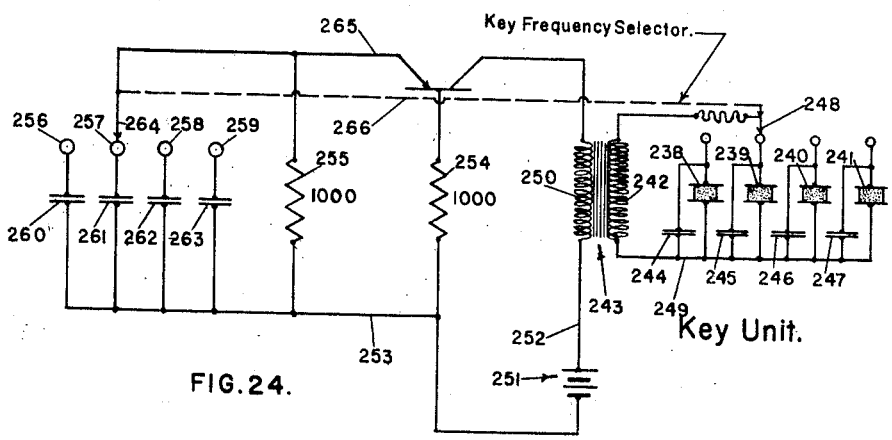
Figure 25:
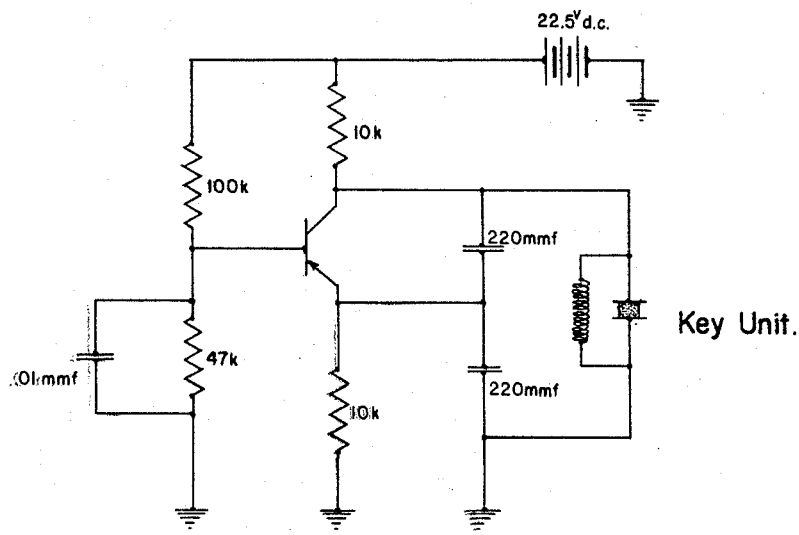
Figure 26:
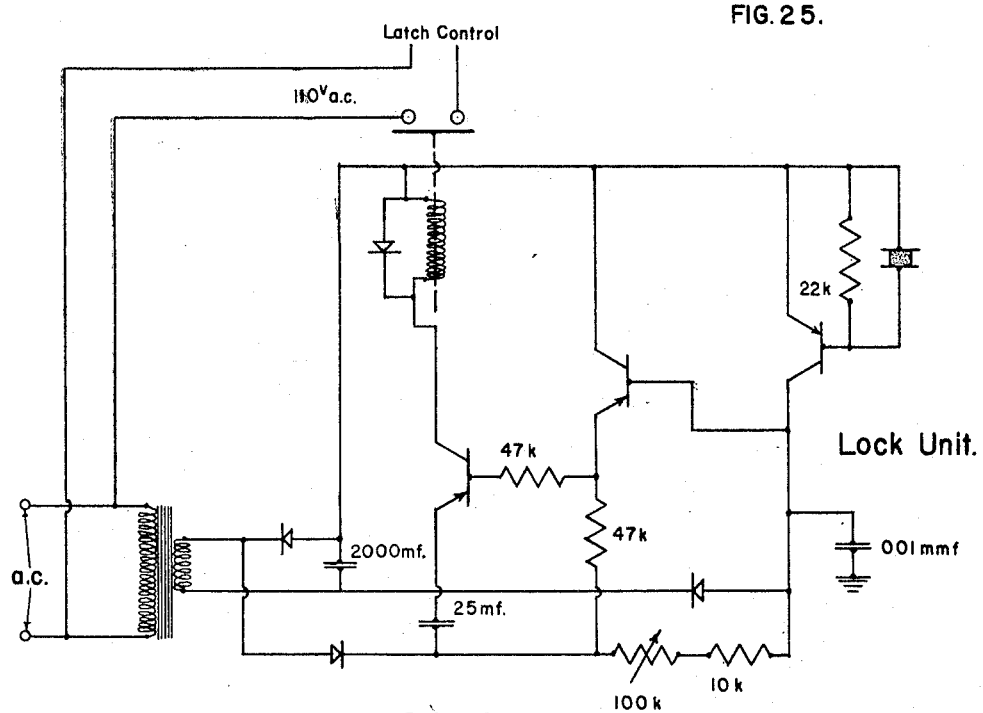
Figure 27:
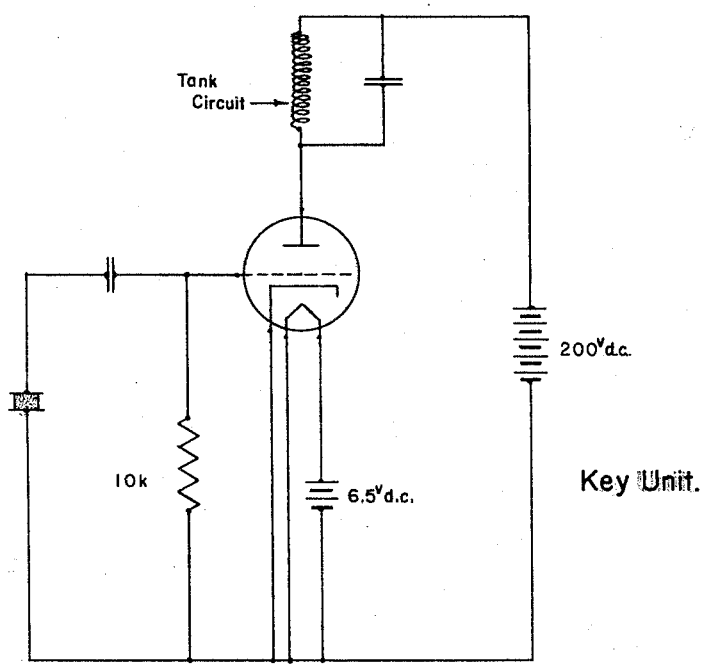
Figure 28:
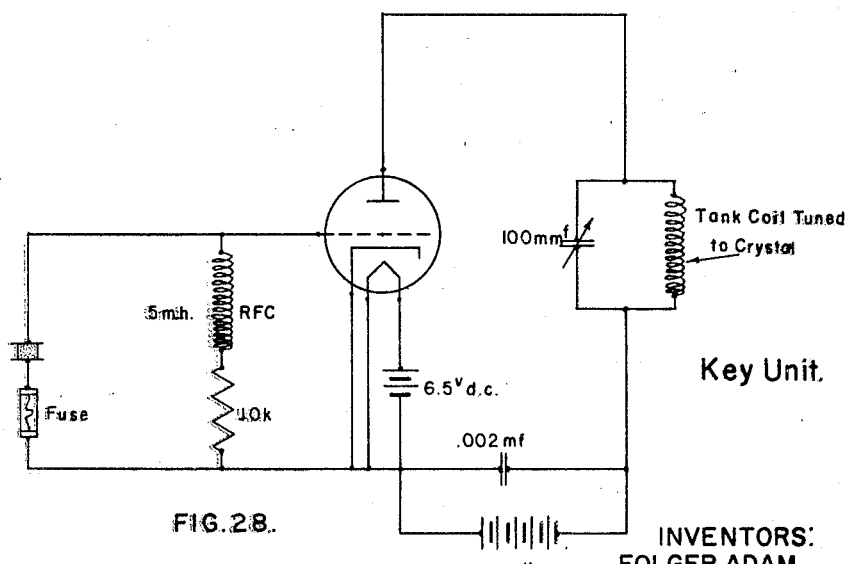
Figure 29:
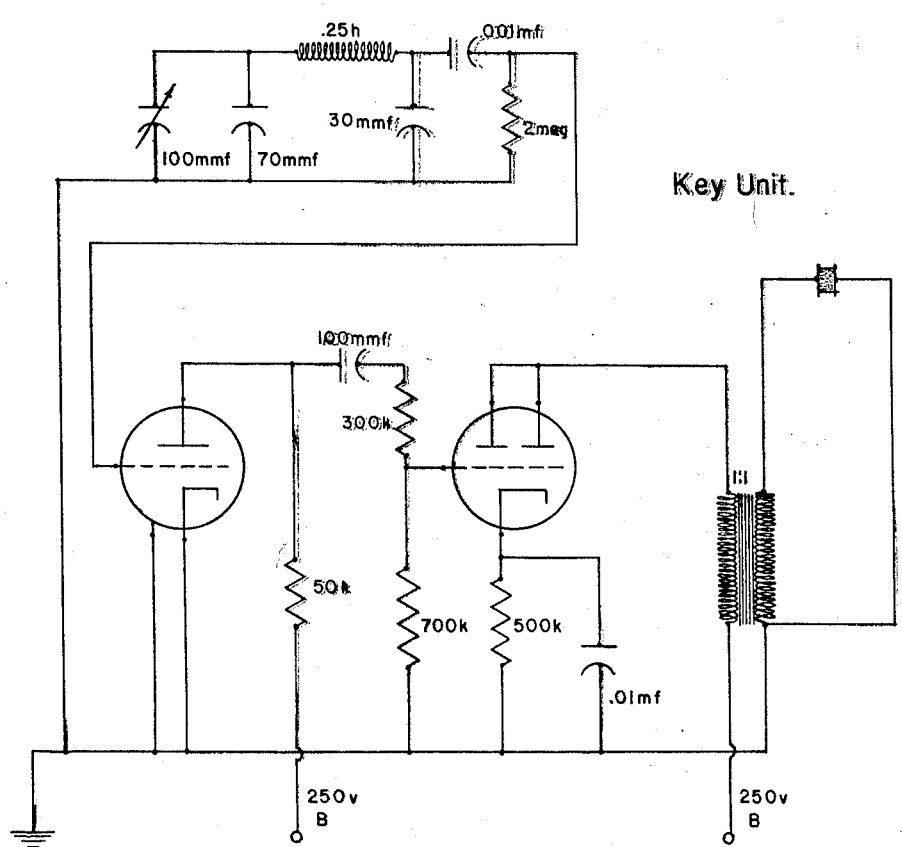
Figure 30:
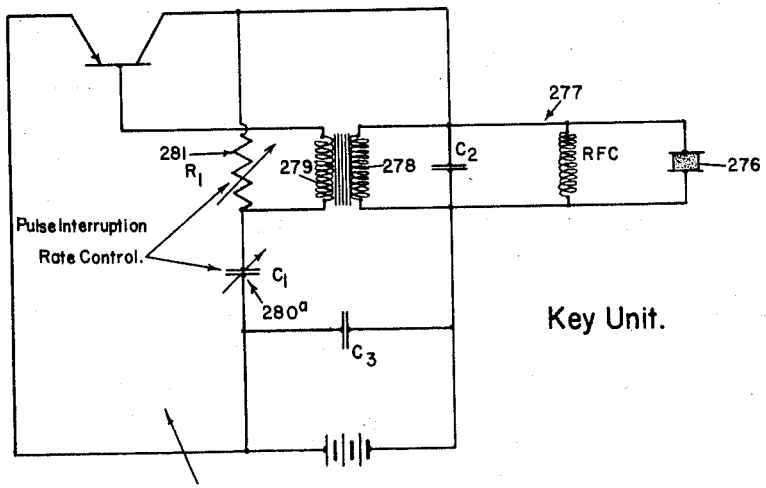
Figure 31:
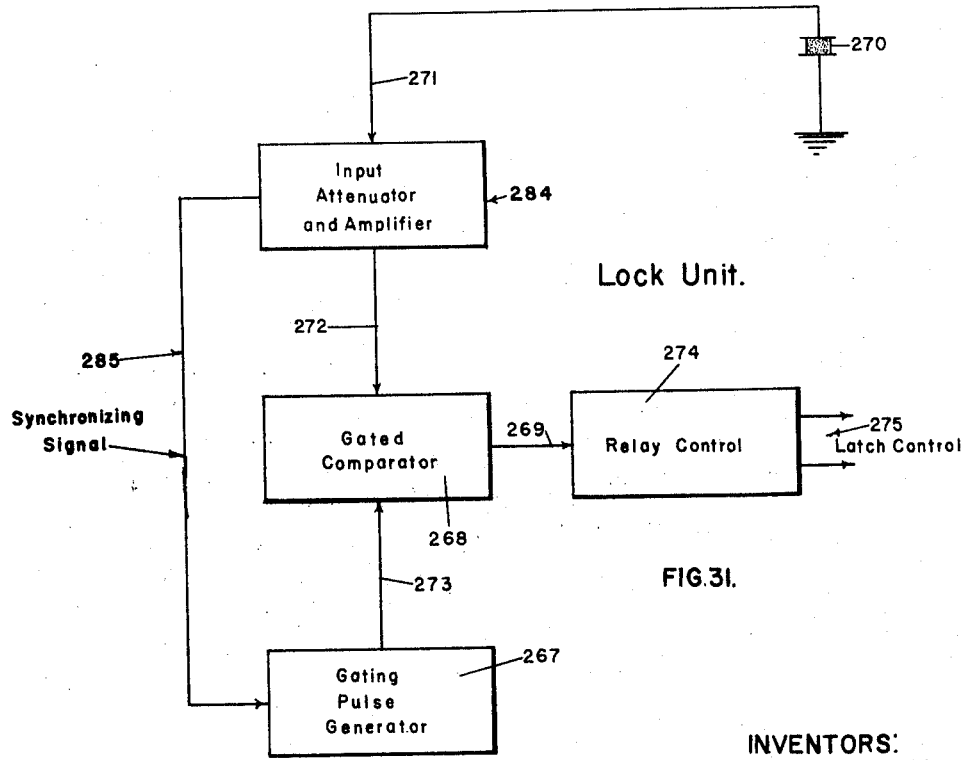

FIGURE 11 shows a schematic circuitry for a key unit including a crystal which is electrically brought into physical vibration by electric impulses produced at the natural resonant frequency of such crystal so as to cause the crystal to physically vibrate with a maximum amplitude of such vibrations, being its resonant vibrational condition with a maximum amplitude of its vibrations; and this figure shows a temperature responsive element for varying the reactance of one of the components of the oscillator (being the capacitance thereof) to vary the frequency of such oscillator with temperature variations to thus retain the oscillating frequency substantially equal to the resonant frequency of the crystal as such temperature varies;

FIGURE 12 shows a schematic circuitry for the lock unit; and it is here noted that the circuitry in each of FIGURES 11 and 12 includes a transistor, to which reference will be hereinafter made;

FIGURE 13 shows in outline one embodiment of the crystal element of the key unit shown in FIGURE 11, such crystal element portion being shown in longitudinal section; and this figure also shows schematically a container or carrier for the circuitry used in connection with such key crystal element, the wires connecting such circuitry to the crystal element being broke away in parts;

FIGURE 14 shows an end view corresponding to FIGURE 13, looking at the crystal end thereof;

FIGURE 15 shows on somewhat enlarged scale a longitudinal section through another embodiment of the crystal element and holder therefor; and in this embodiment we have made provision for, in emergency, enabling the guard or other person to cut the wires constituting portions of the key unit circuitry by mere pressure exerted on a hand button provided for such purposes, thus disabling the key unit, and making it inoperative;

FIGURE 16 shows a fragmentary detail of a portion of the stem of such hand button, showing the shear pin which normally retains the cutting element from depression far enough to thus cut the wires so that normal hand pressures exerted on such button will not produce the disabling operation, such shear pin however yielding for shear upon exerting a stiff sudden pressure against the hand button;

FIGURE 17 shows a simple schematic circuitry and the lock units and the physical vibration responding elements for a plurality of such lock units; such vibration responding elements and required circuitry being located at a control stand or cabinet removed from the locations of the lock units to be controlled thereby, with simple circuit connections from each of the vibration responding elements and its circuitry to the corresponding lock unit, for actuation or activation of such lock unit elements to produce unlocking when the proper key is brought into physical engagement with the proper element of the control stand or cabinet;

FIGURE 18 shows a modified embodiment of the key unit wherein two crystals of characteristics and specifications such that they have different resonant frequencies of physical vibration or coding are embodied in the key unit, in such way that both of such crystals will be activated at the same time to produce their two vibrational frequencies concurrently; such key unit being intended for use with a lock unit provided with sensing elements corresponding to such two frequencies, and being provided with circuitry to correlate the sensed signals for production of lock functioning only when both of the emitted signals are received and properly translated by such lock unit circuitry;

FIGURE 19 shows an embodiment of lock unit circuitry and sensing elements to be used for sensing and translating the two received signals emitted by the key unit of FIGURE 18, and to produce intended lock unit response under such conjoint reception of such two key produced signals;

FIGURE 20 shows another embodiment of features of our invention in which the circuitry of the lock unit is supplied with A.C. from a convenient source, such as a conventional current supply outlet, and with the primary winding of a transformer unit, the key unit being provided with its circuitry and with a secondary winding of such transformer unit, the arrangement being such that the secondary of such transformer unit is registered with the core of the primary of such transformer unit when the physical vibrational elements of the key unit and the lock unit are registered and in physical engagement with the solid partition between them;

FIGURE 21 shows another embodiment of the key unit, in which unit the circuitry includes cold gas tubes;

FIGURE 22 shows another embodiment of the lock unit, in which unit the circuitry includes cold gas tubes;

FIGURE 23 shows another embodiment of key unit, in which the circuitry includes transistors;

FIGURE 24 shows another embodiment of key unit which is provided with crystals and circuitry by which any one of such crystals may be activated for use with the sensing element of the lock unit to activate such lock unit's elements; the key unit here shown including four crystals of different resonant frequencies of physical vibration, and the circuitry corresponding to each such crystal being proper for the fundamental frequency of its crystal; and this embodiment includes switching means shiftable to individual switching positions corresponding to the several crystals, and so arranged that when moved to any selected switching position the desired crystal will be brought into service with the corresponding circuitry included in the operation so that the crystal may be activated in proper manner to deliver vibrations of its fundamental frequency;

FIGURE 25 shows another embodiment of key unit including transistors in its circuitry;

FIGURE 26 shows another embodiment of lock unit including transistors in its circuitry;

FIGURE 27 shows another embodiment of key unit including vacuum tubes in its circuitry;

FIGURE 28 shows another embodiment of key unit including a vacuum tube in its circuitry;

FIGURE 29 shows another embodiment of key unit including vacuum tubes in its circuitry;

FIGURE 30 shows another embodiment of key unit which includes a crystal physical vibration element of pre-determined fundamental frequency, together with circuitry which includes circuit elements by which the sustained vibrations of the crystals are delivered in successive pulses, with intervals of non-vibration between successive pulses; and also includes circuit elements by which the durations of such pulses, and the durations of the non-vibration intervals between the pulses may be varied under control of the person manipulating the key unit, so that such pulses of such sustained frequency may be matched to the specifications of operation of a specific lock unit, and to match the pulse specifications to which the circuitry of such lock unit is pre-set or adjusted, so that lock unit response will occur only when the impulses delivered by the key unit match both the sustained frequency value and the pulse duration and pulse time spacing (pattern) of the lock unit; it being noted that the adjustability of the durations of the pulses and of the non-vibration intervals delivered by the key unit make possible the use of such unit with a group of lock units having different durations of the pulses and of the non-vibration intervals; and FIGURE 31 shows another embodiment of lock unit by conventional block diagram circuitry showing; which lock unit is provided with circuitry responsive to pulses of pre-determined duration and of pre-determined time intervals between successive such pulses; such a key unit as that shown by FIGURE 30 being usable for activating the lock unit embodiment shown in FIGURE 31;

Referring to FIGURES 1 to 10, inclusive, we have therein shown one physical embodiment of a lock which is provided with the features of invention herein disclosed. This lock unit includes the casing 50 which includes the floor 51, the side walls 52 and 53, and the top and bottom walls 54 and 55, respectively, together with a front enclosing plate 56. Such enclosing plate may, on occasion be removed, being secured in place by screws or the like set into corner thimbles 57 welded to the proximate surface portions of the walls and ends of the housing.

A reciprocable latch element 58 is slidably mounted in the housing with its door or keeper engaging end 59 projecting from the housing and shown as bevelled in conventional manner to enable snap-locking of the closing door. Preferably there is provided a reinforcing plate set against and secured to the inner face of the side wall 52 at the location of the latch, such plate being provided with an opening to pass the latch, and to guide the latch in its reciprocations. This plate is numbered 60. The latch proper is of rugged construction, in its portion which reciprocates through such plate 60, and an extension guide rod 61 is secured to the inside end of the latch, such rod working in an opening of the flange 62 of an angle bar 63 secured to the floor of the housing. A spring 64 is located on such rod and has its ends engaged with the proximate faces of the flange 62 and the latch, to exert urge of the latch to its extended or locking position, shown in several of the figures. Such latching movement of the latch is limited by engagement of a plate 65, carried by the latch, with the inside face of the plate 60, being the position shown in FIGURE 1 and elsewhere.

Conveniently the latch is formed of two sections shown as 58$^a$ and 58$^b$ in FIGURE 5. These two sections are fitted together with their proximate ends in overlapping engagement, and two machine screws 66 and 67 serve to secure such two sections rigidly together. Then, the plate 65 is provided with an opening to receive the leftwardly extending end portion of the section 58$^b$, so that when the two sections are assembled together such plate is locked between such two sections as shown by FIGURES 5, 7 and 8. In addition to limiting rightward or projecting movement of the latch such plate 65 also serves another important function, presently to be explained.

A stud 68, secured to the latch element, extends rearwardly (towards the housing floor), as shown in FIGURE 5, in particular. This stud is engaged by the downwardly extending arm of a power driven bell-crank for retracting the latch, as will be presently explained.

A power solenoid 69 has its base 70 secured to the right-hand face of the flange 62, and projects rightwardly from such flange. The armature 71 of such solenoid is drawn up with a considerable force when the solenoid is energized, but normally drops to its lowered position, limited by the angle bracket 74ª secured to the face of the flange 62, as shown in FIGURE 1. A bell-crank 72 is journalled on a stud 73 secured to the floor of the housing; such bell-crank having the horizontal arm 74 and the vertical depending arm 75 which depends just to the right of the stud 68. A rod 76 connects the armature 71 with the horizontal bell-crank arm 74 so that energization of the solenoid serves to rock the arm 75 leftwardly, thus drawing the latch element leftwardly for the unlocking operation. It is here noted that, due to the urging of the spring 64 the latch will be retained in its leftward drawn position only as long as the solenoid is energized, or until a trigger lock, presently to be described, is released. Thus, the unlocking position of the latch may be maintained even after a power impulse produced by a short energization of the solenoid, is terminated.

The bell-crank 72 is also provided with a rightwardly extending shoulder or seat 77 which may be engaged by a downwardly movable stud 78 to produce bell-crank rock for the latch unlocking movement, even when the solenoid 69 is not energized. Such stud 78 is carried by the vertically movable pin or bar 79 of a manually operable key lock element 80, such key lock element being provided with the conventional key rotated pin 81, having the key receiving opening 82. Upon inserting a proper key into such key opening, and turning the key, such pin 81 is rotated to cause the bar 79 to drive down, thus effecting rock of the bell-crank independently of solenoid energization. By this arrangement, the unlocking operation may be performed either by electrical means or by manual key operated means.

The front plate 56 of the housing is provided with a key opening 83 in alignment with the key opening 82 of the manually operated element 80, so that such manual key operation may be effected when the opening is unobstructed.

Within the housing, and at both the front and back faces of the lock element 80 are provided the downwardly depending shutter elements 84 and 85 of generally triangular form. The upper ends of such shutter elements are pivoted on the end portions of a journal pin 86 which is carried by the downwardly extending end flanges 87 and 88 of the U-shaped bracket element 89 secured to the upper or top wall 54 of the housing. The two shutters are connected together by a cross plate 90 so that such shutters must swing as a unit and thus in harmony; and such cross plate 90 also serves another purpose presently to be explained. A spring 91 has one end engaged with one of the shutters and its other end engaged with the the top of the housing. Such spring is biased to constantly urge rock of the shutters clockwise (when viewed as in FIGURE 1). Thus the spring urge is in direction to move the shutters into position where they do not interfere with insertion of a key into the key opening 82. As long as the shutters are retained in their rightwardly rocked positions, however (as shown in FIGURE 1) against such spring urge the shutters remain in their key insertion interfering positions.

Another solenoid 92 has its base portion 93 secured to the forwardly extending flange 94 of another section of angle bar 95, which angle bar section is secured to the floor of the housing by the screws 96. The armature 97 of this solenoid moves up and down according to the solenoid's energization. Two rock arms 98 and 99 have their left-hand ends journalled on a crosswise extending pin 100, which pin is carried by a bracket 101 secured to the housing floor. A spring 102 urges rock of one of the arms downwardly, such spring having one end engaged with such arm, and its other end in engagement with the lefthand wall 53 of the housing. The two arms 98 and 99 are connected together by the crosswise extending plate 103 (see FIGURE 1), the ends of such plate conveniently being spot welded to the faces of the arms 98 and 99. Thus the two arms must rock in unison. The two arms are also connected together by a crosswise extending pin 104, and a link 105 has one end pivotally connected to the armature 97 by the pin 106, and its other end pivoted on such crosswise extending pin 104. Thus, raising of the armature by energization of the solenoid 92 serves to rock both of the arms 98 and 99 upwardly against the down rocking urge of the spring 102. The up movement of the solenoid's armature 97 is limited by engagement of such armature body with the bottom face of the solenoid structure; downward movement of such parts may be limited by limitation of the downward movement of such armature by reason of its design, such downward movement limiting means not being shown, as it may be conventional.

The arms 98 and 99 are of bent form, as shown in FIGURES 1 and 2, so that their leftward or pivoted ends are close together, whereas their right-hand ends are considerably spaced apart and thus brought rather close to the inner proximate surfaces of the shutters. Nevertheless such right-hand end portions of such rock arms lie between the shutters. Such right-hand end portions of the rock arms 98 and 99 are also enlarged vertically into generally triangular form, as well shown in FIGURE 1, at 107. These triangular portions thus provide the rightwardly facing cam edges such as 108. Such cam edges engage the inner face and/or lower edge of the cross plate 90 which joins together the right-hand edges of the shutters with a camming action when such rock arms 98 and 99 are raised by energization of the solenoid 92, thus forcing the shutters rightwardly into the key insertion interfering position of FIGURE 1 (full lines). At the upward limited position of rock of such rock arms the extreme right-hand ends of the arms 98 and 99 flatly engage the left-hand face of the cross plate 90, being properly formed to produce such result. Upon discontinuance of energization of the solenoid 92 the arms 98 and 99 are forced down by the spring 102, thus allowing the shutters to swing leftwardly under urge of the spring 91, and remove the shutters from their positions of interference with key insertion.

It now appears that we have provided means to interfere with, and thus to render practically inoperative, the manual key operated unlocking elements of the lock unit, as long as, and only as long as a current supply is provided to the solenoid 92. Thus, if that current supply be the conventional service supply of current any interruption to that supply, or any other interruption of supply to such solenoid, will automatically allow shift of the shutters into position such that the lock unit may be manually unlocked.

Reference is again directed to the solenoid 69 and the operative connections by which it serves to shift the latch to its unlocking position when such solenoid is energized.

Directly beneath the latch element is a trigger locking element in the form of a rock bar 109. This bar is pivoted on the stud 110 which extends forwardly from the floor of the lock unit housing. A spring 111 has one end engaged with the bar 109 and its other end engaged with the housing so that said spring constantly urges the bar to rock counterclockwise into its "raised" position shown in FIGURE 1. The right-hand end portion of this bar when so rocked, is raised high enough to come to the left of the lower portion of the plate 65, and thus to prevent leftward movement of the latch 58 for unlocking. Such position of the parts is shown in full lines in FIGURE 1. Thus such bar serves to prevent any movement of the latch to its unlocked position by an improper operation, such as by the use of a tool inserted between the stationary door casing to which the lock unit is secured, and the proximate edge of the closed door. However, by rocking such bar down against the urge of such spring 111 the right-hand end of such bar is lowered sufficiently to allow the latch to be shifted leftwardly for the unlocking function. Such down rock of the bar is effected as follows:

The upper edge of the bar 109 is provided with a notch 112 which receives the lower end of the bell-crank arm 75 which arm serves, when rocked leftwardly to draw the latch in the unlocking direction. The leftward end of such notch 112 is of cam formation and is engaged by the proximate surface of the lower end portion of the arm 75 as such arm is rocked leftward, thus depressing the bar far enough to remove its right-hand end from any interference with the leftward and unlocking movement of the latch. Examination of FIGURE 1 shows that, with the arm 75 in its there shown position its lefthand edge does not yet engage the stud 68 of the latch element, so that some leftward movement of such arm 75 may and does occur before the drive of the latch leftward must commence by continued leftward movement of such arm 75. Thus, by such lost-motion it is possible to normally ensure dead-locking of the latch element against unintended or unauthorized movement in the unlocking direction, and yet to ensure that further leftward movement of the arm 75, produced by the energization of the solenoid 69, will produce needed leftward movement of the latch in its unlocking direction.

The depression of such bar 109 during the first portion of the leftward movement of the bell-crank arm 75 is shown by the dotted line position of such bar 109 in FIGURE 1.

The upper edge portion of the bar 109 is also provided with a more leftward notch or depression 113, providing the right-hand end shoulder 114. This depression and this shoulder are so positioned that as the lower end portion of the arm 75 approaches its most leftward terminus of swing (thus completing the unlocking movement of the latch), such lower arm end will move past such shoulder, allowing the bar to immediately swing up under urge of the spring 111, and thus temporarily latching the locking latch in its fully unlocking position, since the retaining of the arm 75 in its leftwardly moved position also retains the latch 58 in its unlatched position due to engagement of the latch stud 68 with the arm 75. Accordingly, until another function is performed the latch 58 will now be retained in its unlatched position. Thus, too, a rather short impulse of current delivered to the solenoid 69 will ensure unlocking of the door, and retention of the lock's latch in such unlocked condition after termination of the unlatching impulse.

A stud 115 is secured to the left-hand end portion of the bar 109, and at a point leftward of the pivotal point of such bar. Preferably a roller 116 is journalled on such stud to ease the function performed by such stud. A trigger release bar 117 is slidably mounted in the lower portion of the lock unit's housing. The right-hand portion of the release bar is extended through an opening of the right-hand wall 52 of the housing, and an extension of such release bar 117 extends through an opening of the flange 62 for guidance purposes, among other things. This release bar is normally urged rightwardly by a spring 118 (such release bar being shown in its depressed position in FIGURE 1 by full lines, and in its released position by dotted lines at its right-hand end).

An adjustable nut 119 mounted on the lefthand portion of such release bar and leftwardly of the flange 62 serves to limit the rightward movement of such release bar when such rightward movement is permitted. A roller 120 is set into a slot formed in the right-hand end portion of such release bar, such roller being journalled on a vertical stud 121 for ease of roller roll during the backward or leftward drive of the release bar by engagement of the edge of the door with such roller during door closing operation, and just before the door is fully closed. Such door closing movement thus serves to drive the release bar from its dotted line position to its full line position, and to retain such bar in such full line position as long as the door remains fully closed.

The trigger bar roller 116 normally engages the upper surface of the release bar 117 of a part of such bar. Conveniently the part of such release bar thus engaged by such roller is a section 117ª. The upper surface of such section 117ª is provided with an extended flat surface on which the roller rides or rests when such release bar is in its door closed and release bar engaged position; but such release bar also includes an upwardly extending cam portion 123 which engages the roller of the trigger bar as the release bar is projected rightwardly when the door is opened, and conveniently a dwell 124 is provided at the extreme left-hand end of such cam portion 123. Thus, when the door is opened and such release bar is projected rightwardly by its spring 118, with corresponding ride of the cam 123 beneath the roller 116, and thus the trigger bar is rocked clockwise to disengage the shoulder 114 of such trigger bar from the lower end portion of the arm 75, allowing such arm to swing rightwardly, and thus also allowing the latch element to move out into its latching position shown in FIGURE 1. The release bar 117 will then remain in its rightwardly projected or dotted line position (see (FIGURE 1) as long as the door remains open; and the trigger bar 109 will accordingly be retained in its clockwise rocked position (shown by dotted lines in FIGURE 1) as long as the door remains open.

Thus, having opened the door and the impulse of current which produced the unlocking operation, having ceased, both the latch 58 and the release bar 117 will remain rightwardly projected until the door is again closed. Such door closing will cause the latch to be shoved leftwardly due to the cammed end 59 of the latch. About the same time as the latching operation occurs, or in any case, when the door has been fully closed and latched closed, the release bar 117 will have been forced leftwardly its full amount, to its full line position, thus carrying its cam surface 123 far enough leftward to allow the trigger bar to be restored to its full line position of FIGURE 1 by the time the door closing and locking operation has been completed. Then the parts will be ready for another cycle of operations.

To enable close adjustment of the elements concerned in the foregoing cycle of operations, we have shown the release bar as including the turnbuckle arrangement element 125 between the section 117ª and the right-hand end portion which carries the roller 120. Thus the parts may be brought into relative positions such as to ensure their proper relative operations when the installation is made.

It is here noticed that locks embodying the features above described may be used in connection with doors of both the swinging or hinged support type, or doors of the sliding type. In either case the lock unit should be installed in such manner that movement of the closing edge of the door is in the general direction of the arrow 126 in FIGURES 3, 4, 5 and 6, such arrow being shown as formed on the curve of an arc, and also as a straight line (the line 126ª).

It is noted that there is a space to the left of the flange 62, and between such flange and the left-hand wall 53 of the housing. We have shown schematically the boxes or containers 127 and 128 in such space. These may be used to contain the electronic or electrical elements of the lock unit (with the exception of the crystal or other primary sensing element, presently to be described), provided of course that sufficient volumetric space is available in such containers for accommodating such elements. In certain, if not all, of the embodiments of electronic or electric equipment presently to be described such equipment may be well accommodated within such containers, without need of enlarging the lock unit housing beyond such size as would be required for accommodation of the physical elements already described.

FIGURES 11 and 12 show, schematically, one embodiment of key unit and latch unit, embodying the features of our present invention, which key and latch units are matched together for response of the latch unit by signals produced by such key unit. These units are as follows:

The key unit is provided with a crystal element 129 which will vibrate at a fundamental physical vibration frequency determined by the geometry and size of such crystal unit, such vibrations being produced by subjecting the crystal to a potential difference between its faces 130 and 131, according to the well known characteristics of crystals of suitable material. Examples of such crystals, suitable for the present purposes, are crystals of Rochelle salts, crystals of barium titanates, and crystals of quartz. In stating crystals of such materials as defined above we do not intend to limit ourselves to crystals of such materials, except as we may do so in the claims to follow. However, the barium titanate crystals have been found to be well adapted to the present purposes.

By providing circuitry which will deliver the proper potential difference between the faces 130 and 131 as sustained impulses of such difference of potential, such impulses being delivered to the crystal at the natural fundamental resonant frequency of such crystal, it is evident that the crystal will be caused to vibrate at its maximum amplitude; and such vibrations will continue as long as the impulses of such frequency are delivered to the crystal. Such impulses conveniently comprise the waves of potential delivered at the prescribed frequency to the crystal ends or faces. Two convenient embodiments of the crystal element itself are herein illustrated and will be described hereinafter. It is here noted, however, that the design and construction of the crystal element of the key unit must be such that one of its vibrating faces may be brought by the guard or other person using such key unit, into good, and preferably face to face engagement with a "proper portion" of the lock unit or other unit carrying a sensing element, sensitive to the frequency thus delivered to such portion of the lock unit.

In FIGURE 11 we have included a variable capacitor 132 in the oscillator portion of the circuitry so that by slight change in the adjustment of such capacitor the oscillating frequency of the impulses delivered to the crystal may be slightly raised or lowered to correct such frequency to the natural resonant frequency of the crystal at the temperature of the crystal. Thus the frequency of oscillation of the circuitry may be matched to slight variations in the resonant frequency of the crystal being excited. Conveniently, the slight variations of capacity of such capacitor may be produced by a temperature responsive element, such as a bimetal element 133 connected by a light link 134 with the movable element of the variable capacitor.

A switch 135 is provided for controlling the operation of the vibration excitation circuitry, so that the guard or other person using the key may start and stop vibration as desired. Such control will enable conservation of the current supply, and thus be especially useful when such supply is from a portable battery comprising a portion of the portable key unit, as shown in FIGURE 11.

FIGURE 12 shows circuitry for a lock unit responsive to the physical vibrations produced by the key unit of FIGURE 11 (or some other key unit properly tuned and matched to the sensing requirements of such lock unit). In this case the current supply for the lock unit's circuitry is shown as provided by the battery 136; but evidently any other suitable current supply may be provided, as, for example, that from a conventional A.C. service, proper provision for rectifying the supplied current being provided. The crystal of such lock unit's sensing elements is conveniently shown with one end grounded. This is a convenient arrangement in the case of the sensing crystal of the lock unit, since usually the lock unit will be installed on a stationary structural element such as a door frame element or pilaster at the door closing end of the door opening; whereas, in the previously described key unit which is or may be carried from location to location by the guard or other person, the provision of such a grounding connection might not be convenient. Accordingly, in the case of the lock unit crystal 137, the end 138 is shown grounded, whereas the other end 139 is connected into the circuitry of such lock unit.

Said circuitry of the lock unit of FIGURE 12 includes the transistor element 140 controlled by the impulses delivered or initiated by the vibrations of the crystal; and such transistor controls delivery of power current to the coil 141 of a relay having the movable contact 142, normally engaged with a stop 143, but movable, under force of the armature 144 into engagement with the stationary contact 145 which comprises part of the current supply circuitry to the latch withdrawing solenoid 69 of FIGURE 1 and other figures. Accordingly, when the crystal responds or senses the presence of a physical vibration of frequency to which it is tuned, the circuitry of FIGURE 12 is energized to produce latch withdrawing operation. The relay of which the solenoid 141 comprises an element may, if desired comprise a latching relay, in which case the energization of such solenoid upon receipt of a sensed signal by the crystal may latch such relay into its current delivering position for supply of current to such power solenoid 69 for an interval of time until such latching relay may be unlatched. Nevertheless, as long as the guard or other person retains the crystal of the key unit in proper physical engagement with the proper portion of the lock unit to produce responding physical vibrations of the crystal 137, current will continue to be delivered to the power solenoid of the lock unit with the circuitry arrangement shown in FIGURE 12.

At this point reference is made to FIGURES 13 and 14, showing one form of physical embodiment of the key unit, and to FIGURES 15 and 16, showing another form of physical embodiment of the key unit. In said FIGURES 13 and 14 the signal delivering element, including the physical vibration producing crystal, is designated as 146, and at 147 we have shown a case wherein may be contained the circuitry of the key unit, including, if necessary, the battery which supplies such key unit's circuitry. A flexible light cable 148 connects the case with the element 146, so that necessary freedom of movement is permitted to the guard or other person to enable him to properly perform the needed functions incident to performing an unlocking operation. Conveniently, such case 147 might be detachably connected to the guard's belt or other element of clothing or equipment, the element 146 being held in the hand with its proper end projected towards the housing of the lock unit, and being pressed firmly against the proper portion of such lock unit to ensure intended transmission of physical vibrations from such key unit to the sensing crystal and other elements of the lock unit, with sufficient amplitude of the received vibrations to ensure intended dependable sensing of the signals, with corresponding reactions in the lock unit's elements and intended unlocking operation. To better understand the foregoing relations of the key unit to the lock unit and its elements the following more detailed description is made:

First, the key unit shown in FIGURES 13 and 14 includes the crystal element 149, of length and other dimensions and of geometry proper to have a fundamental or base frequency of physical vibrations exactly of the value proper and/or needed to activate the crystal of the corresponding lock unit, or of frequency within the narrow band to which the crystal and the circuitry of such lock unit will dependably respond. Such crystal element is contained in the cylindrical shell 150. One end of such crystal is capped by a light metal cap 151, having flanges 152 and 153 extending in opposite directions from the floor of the cap. Such crystal's end portion is clamped firmly by the flange 152 so that such cap will dependably remain in place on the end of the crystal. A spring 154 is set between the cap and the left-hand closed end of the shell, a socket 155 being provided in such end to receive and retain the spring properly centered. One of the wires 156 of the circuitry is connected to the cap 151, so that such end is subjected to varying potentials of the circuitry and/or communicates such potentials to such circuitry.

A light cap 157 has the flange 158 extending towards the cap 151, and such flange 158 securely receives and grips the proximate end portion of the crystal. Another wire 159 of the circuitry is connected to such cap 157, so that such end of the crystal is subjected to the potential of such wire 159. Thus varying potentials between the wires 156 and 159 are communicated to the opposite ends of the crystal, or such wires are themselves subjected to varying potentials produced by the crystal itself. The cap 157 is provided with an outwardly extending light flange 160 which seats against the right-hand end of the shell; and such end is provided with an opening to accommodate an extension 161 of the cap, which extension may be in the form of a retaining ring; and finally a thin disk 162 of molded glass or mica or similar material is adhered to the end face of the extension, such disk 162 serving to provide a smooth and even end surface of the crystal element, vibrating with such crystal element, which surface is normal to the axis of vibration of the crystal. Upon pressing such surface firmly against the proper portion of the outside of the lock unit housing, the vibrations of the proximate end of the crystal will be strongly transmitted to the metal of such housing, and through such metal of the housing directly to an end of the crystal element contained within such housing, which end is in secure engagement with the inside surface of such housing at the "proper location" to which frequent reference has been made. Thus, if the vibrations thus physically transmitted through the housing metal are of frequency and characteristics to match the resonant frequency and coding, if necessary, of the crystal and circuitry of the lock unit, such circuitry will be activated and the desired unlocking operation will be produced.

The switch 135 is schematically shown on the case 147 carried by the guard or other person; such switch serving to control the starting and stopping of the physical vibrations produced at the intended frequency by the key unit.

In FIGURES 1 and 10 we have shown, by the dot and dash circles 163 convenient locations at which the crystal of the lock unit may be attached to the inside surface of the front cover plate of such lock unit. If the embodiment which is used includes the provision of two key vibrational elements, so that the corresponding lock unit must have two vibrational sensing elements to match the two of the key unit, the additional lock unit crystal may be conveniently located at the positions shown by the circles 164 of such FIGURES 1 and 10.

Each of such sensing crystals of the lock unit includes a cylindrical housing, such as shown at 165 in FIGURES 2 and 3. Such cylindrical housing 165 is conveniently provided with an end flange 166 which is secured to the inside face of the housing front or cover plate, the crystal end proper being also in direct firm engagement with such inside surface centrally of such flange. It is thus evident that engagement of the key crystal to the "proper portion" of the outside of the lock unit housing or cover will or may produce corresponding response in the circuitry of such lock unit, with corresponding unlocking operation of such lock unit. It is also to be noted that although the crystal units of the lock unit are of considerable length, with corresponding lengths of the cylindrical housings 165, still such elements, when located substantially at the locations shown in FIGURES 1 and 10 do not interfere with necessary lateral movements of the shutters and associated elements, or other elements.

We have made provisions for rendering inoperative the key units in emergencies, such as in case of an attack by a prisoner who might then gain possession of the key unit for a cell or group of cells, with corresponding possibility of such prisoner then unlocking other cells by the use of such purloined key unit. In such a case the unit may generally be destroyed by slamming it suddenly on the hard floor of the cell block or other enclosure, thus breaking the crystal. In FIGURES 15 and 16 we have shown another embodiment of means to purposely render the key unit inoperative. In this case the electrical line 148$^a$ connecting the case 147$^a$ with the crystal unit enclosure is carried, within the housing 167 of the key unit, past a location where such electrical line lies in contact with one wall of the unit's housing, thus affording a rigid support for such electrical line at such location. Then a transversely shiftable cutting pin or knife 168 whose lower end is brought to a sharp cutting edge is in proximity to the electrical line. Such knife element has its upper portion extended through the wall of the housing opposite to the location of contact of the line 148$^a$ with the housing, and brought to the outside of the housing, where it is provided with a button or hand receiving element 169 by which it may be strongly pressed in an emergency, thus driving the cutting edge of the blade through the electrical conductors and rendering the key unit inoperable for the time being. A spring 170 is set between the outside surface of the housing and such botton, and urges the button and the knife's cutting edge away from the electrical lines as shown in FIGURE 15. Suitable means, not shown, limits the movement of the knife 168 away from the electrical line and prevents the knife from being dislodged from the casing. In order to prevent untoward forceful depression of the button, by such an amount of force as will usually be encountered in the normal use of the key unit, and during normal handling of such unit, we have provided the shear pin 171 through the knife element 168 in position to prevent movement of the knife element 168 against the urge of the spring far enough to cut or injure the electrical lines; but in case of emergency such shear pin will be sheared off by the unusual pressure exerted against the button, thus permitting the intended emergency cutting operation to be performed.

We have referred to modifications in which the sensing elements and portions of the circuitry activated thereby for producing the unlocking operations, are located distant from or away from the lock units proper. In FIGURE 17 we have shown schematically circuit elements embodying such arrangements. These are as follows:

In FIGURE 17 we have shown the blocks 172, 173 and 174 indicating three lock units, and also the sensing elements and portions of the circuitry therefor, by the blocks 175, 176 and 177. Such last named elements might comprise, for example, stations corresponding to the three lock units 172, 173 and 174, which stations are located at a control stand distant from the cell doors being controlled, and, in some cases, a stand located in a safe place, inaccessible to the prisoners.

In this figure we have shown the latches for such lock units as 58$^a$, 58$^b$ and 58$^c$, the manual key receiving elements as 81ª, 81ᵇ and 81ᶜ, the power solenoids by which such bolts are retracted for the unlocking operation by the solenoids 69ª, 69ᵇ and 69ᶜ, and the solenoids by which the shutters for interfering with manual key operation by the solenoids 92ª, 92ᵇ, and 92ᶜ, respectively. A single transformer 178, located at the control stand, provides A.C. for all of the functions requiring power, etc., and a single battery 179 is provided at the control stand for providing D.C. for certain of the necessary operations. The primary and secondary of the transformer are shown at 181 and 180, the conventional A.C. supply is shown at 182, and a single cut-out switch 183 is shown in the A.C. supply lines for shutting down all of the operations supplied by such A.C. supply, when necessary. The "proper portions" of the several lock units where the physically vibrational pre-determined frequency and/or coded key elements are to be firmly engaged with the several lock-sensing elements to produce activation of the unlocking operations for the several lock units are shown at 163ª, 163ᵇ and 163ᶜ at the blocks 175, 176 and 177, respectively; and in case the two (or more) crystal element arrangement is to be used for producing activation of any lock unit, the additional "proper portions" of the lock units are shown at 164ª, 164ᵇ and 164ᶜ in this FIGURE 17. It is here noted that we have not deemed it necessary, in FIGURE 17, to show all of the circuitry needed in each of the units 175, 176 and 177 for translating the received physical vibrations into proper responses, since we have hereinbefore made sufficient disclosure of one embodiment for producing such results, and we shall hereinafter disclose several other embodiments of such circuitries. Therefore, in FIGURE 17 we have merely brought to each of the units 175, 176 and 177 D.C. lines from the battery 179 (or other source of D.C.).

In FIGURE 17 we have also shown within each of the blocks 175, 176 and 177 a relay for controlling the delivery of power current (A.C.) to the corresponding power solenoid 69ª, 69ᵇ or 69ᶜ, as the case may be, such relay being energized when the proper sensing response and circuitry activation is produced in the block in question. These are the solenoids 141ª, 141ᵇ and 141ᶜ shown in the blocks 175, 176 and 177. When the proper key unit for any selected lock unit is energized by the guard and brought into firm physical engagement with the "proper portion" 163ª, 163ᵇ or 163ᶜ, as the case may be, the corresponding relay is energized to bring its contacts together, and thus serve the corresponding power solenoid 69ª, 69ᵇ or 69ᶜ, as the case may be, for lock unlocking operation of the corresponding lock unit.

To the foregoing purpose a lead 184 is carried from one side of the transformer secondary to a busbar 185 serving all of the units 175, 176 and 177, and connections are made from such busbar to one contact of each of the relays whose solenoids are shown at 141ª, 141ᵇ and 141ᶜ. From the other contacts of these relays there are carried the lines 186, 187 and 188 to the corresponding power solenoids 69ª, 69ᵇ and 69ᶜ of the respective lock units; and the other ends of all of these power solenoids are connected to a common return line 189 which returns to that end of the transformer secondary opposite to the connection 184. Thus, upon activating any one of the units 175, 176 or 177 by use of the proper key unit, the corresponding lock unit's circuitry will be properly activated to produce latch unlocking thereof.

One end of each of the shutter operating solenoids 92ª, 92ᵇ and 92ᶜ is connected to a common busbar 190 which is connected by a line 191 with the terminal connection 184 to one end of the transformer secondary; and the other ends of such shutter operating solenoids are all connected to the line 189 which connects to the opposite end of such transformer secondary. Thus, as long as current is being delivered by such transformer secondary all of the shutters for all of the lock units will be retained in their interfering positions (as shown by the full lines in FIGURE 1), thus making it impossible to operate the locking elements of any of the lock units by manually operated key. Also, upon interruption of current supply by such transformer secondary, all of the solenoids 92ª, 92ᵇ and 92ᶜ will be de-energized, thus allowing all of the shutters to be retracted by their several springs into key lock non-interfering positions.

Reference to FIGURES 1 and 10, wherein we have indicated the proper positions at which the crystal of the key unit should be applied to the surface of the housing of the lock unit, indicate the positions behind which the responsive crystals or sensing elements of the lock unit are located. At the high frequencies (such as super-audio, e.g., of the order of 50,000 c.p.s.) which are preferably used, the wave propagations of such frequencies are confined substantially to straight paths through the hard material of the housing, being paths normal to the surface of contact between the frequency generating element (of the key unit) and the housing surface so contacted. There is little dispersion of such high frequency waves laterally in the material of the housing enclosure thus contacted. The sensing crystal of the lock unit is secured firmly to the inside surface of the lock housing, with the housing surface firmly engaged by the end of the sensing crystal or a cap secured to such crystal end as indicated in FIGURES 13 and 15, for example. It is noted that the end surfaces of the crystal (or such cap) are substantially normal to the axis of vibration of the crystal, so that such surfaces will vibrate directly back and forth while remaining normal to the crystal axis—the axis of vibration. Accordingly, it is desirable when preparing to use the key for producing sensing element response, to press the key unit against the outer surface of the lock unit housing at the proper location, being alignment with the sensing crystal, and with the end surface of the key crystal in substantially flat engagement with the housing surface. By such firm flat engagement between the crystal end and the housing surface a maximum of vibrational response will be ensured at the housing's outer surface; and since the metal is a good conductor of the vibrations, along a direct path as explained above, a maximum vibrational response will be delivered to the inside surface of the housing metal sheet. By also ensuring strong flat engagement of the end of the sensing crystal with the inside surface of the housing, a maximum vibrational effect will be produced in the sensing or responding crystal, with a correspondingly large piezo-electric effect produced in such crystal. Shock voltages of the order of 200 volts or more may thus be produced between the ends of the sensing crystal, the value of the piezo-electric voltage thus induced depending on the amplitude of the vibrations produced in such crystal, and the accuracy of production of such vibrations along the principal axis of the crystal, and the manner in which the crystal is cut with respect to its crystalline planes, and other factors well known in the arts.

Due to the straight line propagation of the high frequency waves through the material of the lock unit housing, it is not only necessary to bring the crystal end of the key unit into registry with the "proper location" of the exterior of such housing, but it also becomes possible to make provision for the simultaneous use of two or more key units of different frequencies with corresponding sensing elements of the lock unit, of characteristics to respond only to such different frequencies respectively, and circuitry in the lock unit corresponding to each such frequency and responsive thereto, together with means in or in connection with such lock unit's circuitry, to produce the desired end function (the activation of the lock unit's elements) only when signals of such different frequencies are received at the proper locations of the lock unit housing, and in proper timing (for example, simultaneously). Thus, a simple form of coding is possible by use of such plurality of different frequency key units, together with sensing elements in the lock unit responsive only to such responsive frequencies.

The foregoing distinctive function is possible due to the fact that the different frequencies, which are simultaneously produced for "sustained" intervals, are not mixed in the material of the lock unit's housing, but remain separate clear through the thickness of the housing sheet at the locations where such frequencies are being delivered to the housing sheet, and where they are being transferred from the inside surface of such sheet to the sensing elements.

The material of the lock unit housing should be hard enough to transfer the high frequency waves through its thickness without such loss of amplitude as would seriously impair the ability of the sensing element to respond to such frequency when received at the proximate end of such sensing element. One such material is hard steel. Others may be used which will comply with the requirement above stated. We have also found that it is desirable to have the outside surface of the housing uncoated with any soft material such as various kinds of enamels, paints, and other finishing materials. This is due to the fact that even thin layers of such soft materials will materially reduce the transmissibility of the high frequency waves, with corresponding impairment of the strength of the received signals. It is therefore desirable that the outside surface of such housing, at the proper location of the contact of the end portion of the key unit therewith, should be smooth, and even polished for most effective results in operation.

If desired, the "proper location" for contacting the end portion of the key unit may be indicated by suitable marking, such as a circumscribed line; or, to further assist in the operation of bringing the key unit into its proper registry with the housing sheet, such sheet may be provided with a slight depression of the surface thereof, of size and shape to receive such end portion, and locate it exactly where proper. Such a depression may be of the order of one or two hundreths of an inch depth, with production of an encircling shoulder of like amount.

Reference is next made to FIGURES 18 and 19 wherein we have shown an embodiment in which two key units, having characteristics for producing "sustained" vibrational frequencies of different values, are provided. These two key units include the two crystals 192 and 193, and the circuitry 194 and 195 for such two crystals, respectively. Both crystals are activated by energy derived from a common source battery 196, and are controlled by a common switch 197; and the two transformers 198 and 199 are provided in connection with the two circuitry sections 194 and 195, respectively.

The lock unit corresponding to the two crystal key unit is schematically shown in FIGURE 19. There the two crystals 200 and 201 are provided to receive and respond to physical vibrational signals received from the two key unit crystals 192 and 193, respectively it being understood that although in FIGURES 18 and 19 the key crystals 192 and 193 are not shown in vertical alignment with the corresponding lock unit crystals 200 and 201, respectively, in reality such key crystals 192 and 193, will when used for activation of the lock unit's elements, be brought into engagement with the outside surface of the lock unit housing at positions physically aligned with such lock unit responding crystals 200 and 201, respectively. Then, assuming that the fundamental physical vibrational frequencies of the key crystals 192 and 193 are the same as or within the band spreads of such lock unit crystals 200 and 201, response will occur to both of such lock unit crystals simultaneously or in such harmony that the activations produced by both of the lock unit's crystals can be combined to produce the end effect of causing the lock unit's elements to unlock or otherwise, as intended.

Such combined effect may be produced in various ways. In the specific embodiment shown in FIGURE 19, we have provided the two circuitry arrangements shown at 202 and 203, respectively, tuned to the vibrational frequencies of the corresponding crystals 200 and 201, so that when such circuit arrangements are activated by resonant frequency vibrations of their respective crystals, the two solenoids 204 and 205 of the relays 206 and 207 will be energized, to raise their armatures 208 and 209, thus closing the pairs of contacts 210–211 and 212–213, respectively. These pairs of contacts are series connected by the line 214 so that when both solenoids are simultaneously energized a circuit to activate the power solenoid 69 of the lock unit will be closed, thus producing the desired end result or function. For simplicity of illustration, only the terminals 215 and 216 comprising a portion of such power solenoid energizing or activating circuit are shown in FIGURE 19. Or, if desired, the power solenoid 69 may be the solenoid shown at 217 in FIGURE 19.

Referring next to the embodiment shown in FIGURE 20, in this case we have provided means to generate a supply of current for activating the key unit's elements from the same current supply which is used to activate the lock unit's elements, thus eliminating need of providing a battery or a separate cord connection or the like, from the key unit to a conventional current outlet. We have hereinbefore referred to this combined current supply embodiment. As illustrated it includes induction means to transfer energy from the lock unit elements to suitable key unit secondary inductive elements when such key unit is properly associated with the lock unit with which it is intended to be used. The illustrated embodiment includes the key unit crystal and the lock unit crystal, 218 and 219, respectively, the A.C. supply 220 (which may comprise connection to the conventional current supply, since the lock unit may be carried by a stationary element, such as a structural pilaster of the cell block, in the case of a prison cell installation), the circuitry 221 of the key unit, activated by the physical vibrations of the key unit crystal 218, the A.C. input lines 222 and 223, and the full wave rectifying unit shown at 224 as including the four rectifying elements of conventional and suitable form, such as varistors. Such A.C. input lines 222 and 223 receive their supply from the secondary 225 of a transformer of which the primary is comprised within the lock unit, as will presently appear. It is not deemed necessary to describe the circuitry shown at 221 in complete detail, but such circuitry complies with the functional requirements in its relation to the characteristics and physical vibrational frequency of the crystal previously explained in some detail.

The lock unit, complementary to the key unit just described, includes the circuitry 226 responsive to the vibrational frequencies of the crystal 219, activated by the physical vibrations of the key crystal 218, to translate such physical vibrations of the crystal 219 and activate the relay element 227 including the solenoid 228, for energization of the power solenoid 229 to produce the desired end result of operating the latch of the lock unit, according to the functions already explained in detail. Conveniently, such lock unit circuitry also includes the transformer 230 having its primary 231 supplied with A.C. from the A.C. supply 220, and with the secondary 232 of such transformer delivering to the full wave rectifier 233, shown as including the four rectifying elements of conventional and suitable form, such as varistors.

The A.C. delivered over the supply connections 220 is also delivered to the primary 234 of the transformer of which the secondary 225 comprises an element. Such transformer includes the core element 235 (conveniently shown as a straight element) the upper end of which core element extends through a body of non-magnetic material 236 comprising a portion of the lock unit housing. The top or outer surface of such body 236 preferably is a smooth continuation of the outside surface of the housing, with such core element 235 brought to such surface and comprising a smooth continuation of such surface. Thus, as long as current supply is maintained from the connections 220 such core element 235 is magnetically energized, and produces the usual counter-electro-motive force for limitation of current through the primary 234.

The secondary 225 which comprises a portion of the circuitry of the key unit, is provided with a core 237 having its lower end of smooth surface for good magnetic engagement with the exposed surface of the core element 235 when the key unit is set against the exterior of the lock unit housing in position for alignment of the key crystal 218 with the lock unit crystal 219. That is, registration of the core 237 with the core 235 is produced simultaneously with registration of the key unit's crystal with the lock unit's crystal, provided that the spacing between the key unit's crystal and core is substantially the same as the spacing between the lock unit's crystal and core, and provided that the key unit be applied to the lock unit in position to produce simultaneous registry of both of the core elements together, and both of the crystal elements together. Under these conditions of simultaneous registry of such elements, the magnetizations of the primary core element 235 needed to deliver secondary current through the secondary winding 225 will occur so that proper activation of the key unit's circuitry will be produced, needed to produce operation of such key unit in intended manner.

Upon removing the key unit from the lock unit the generation of secondary current for the key unit will cease, so that such unit will remain "dead" until brought into proper registry with a lock unit provided with the necessary primary winding and core to activate such key unit's secondary in the intended manner.

Reference is next directed to FIGURE 24 in which we have disclosed, schematically, an embodiment of key unit provided with means to activate crystals having different resonant frequencies corresponding to the frequencies of different lock units, together with means in such key unit to enable activation of any one of such key unit crystals in the previously explained manner, and according to such previously explained operations; so that such single key unit may be used selectively for activating any one of the corresponding frequency lock units. Thus the number of key units which need be provided for a large number of differently frequency-calibrated lock units may be much reduced, and proportionately to the number of frequencies for which provision has been made in such single key unit. To this end such embodiment of FIGURE 24 includes the following:

We have shown four crystals 238, 239, 240 and 241, of different physical vibration frequency values, as, for example, 45,000 c.p.s., 50,000 c.p.s., 55,000 c.p.s., and 60,000 c.p.s. The resonant frequency of each such crystal will depend on its physical characteristics, composition, etc., as has been referred to hereinbefore, and well known in the arts. A simple form of circuitry is shown for activating each of these crystals at its resonant frequency. This circuitry includes the secondary 242 of the transformer 243, and the capacitors 244, 245, 246 and 247 for the respective crystals. A movable contact 248 connected to one end of the transformer secondary enables selection of any one of the crystals for activation, the other end of such secondary being connected to all of the capacitors 244, 245, 246 and 247, by the lead 249. The primary 250 of such transformer is fed from the battery 251 by the lead 252, and the other side of such battery connects, by the lead 253 with the resistors 254 and 255, and with the stationary contacts 256, 257, 258 and 259, by suitable leads including the capacitors 260, 261, 262 and 263. These several capacitors, and other elements of circuitry, are so proportioned that for any setting of a movable contact 264 to a selected one of the stationary contacts, which movable contact is connected by the lead 265 and other circuit elements to the resistors and the transformer primary, the resonant frequency of the circuitry then connected to the crystal and of such other elements, will harmonize, thus producing crystal physical vibration of the selected crystal, at its resonant frequency, and with a maximum of vibrational amplitude. The two movable contacts 248 and 264 are connected together by the schematic connection 266 so that when the contact 248 is brought to any selected crystal's connection or a stationary contact, the contact 264 will be brought to the proper one of the stationary contacts which it may engage.

We have referred to the fact that provision may be made for producing a coded signal by an appropriately arranged key for activating the circuitry of a lock unit which circuitry is provided with elements, properly integrated, to require reception of a coded signal, the coded signal of such key unit being properly harmonized to produce such activation of the lock unit equipment. In FIGURE 31 we have shown, schematically a circuitry of the lock unit, designed for response only to signals received, not only at the prescribed physical vibrational frequencyy, but also according to the coding for which such lock unit's circuitry is designed, and to which coding, only, such lock unit's elements will respond in intended manner. This lock unit coded circuitry includes the following elements:

A gated pulse generator 267 delivers a pre-determined series of pulses, coded according to the prescribed code, to a gated comparator 268 where said pulses are received but are blocked against transmission to another unit, either as pulses or as some other form of signal, unless such gated comparator also receives another series of pulses of duration and timing to un-block the first received series of pulses. Normally such blocking occurs, so that no signal is delivered over a line 269 to the element, legended in FIGURE 31 as "Latch Control." Thus, although such first stated series of pulses from the unit 267 are being continuously delivered to the comparator, no signal is emitted by such comparator, and the "Latch Control" is not activated to produce the desired lock functioning result.

The crystal 270 is engaged with the lock unit's housing in proper manner to receive physical sustained vibrations of the resonant frequency of such crystal, when physical vibrations of such frequency are delivered to such crystal, according to the teachings already detailed hereinbefore. When such sustained physical vibrations of such frequency are received, either continuously or as pulses of various durations, and of various time spacings between the pulses, corresponding signals are delivered over the line 271 to the unit legended "Input Attenuator and Amplifier." From this unit 271 corresponding signals are delivered to the Gated Comparator 268. In such Gated Comparator they are compared to the signals from the unit 267, arriving over the line 273. For this purpose the unit 268 includes means to compare the timing and durations of the "Sustained" signals arriving over the line 272 (being based on the signals from the crystal 270) with the signals emitted by the unit 267. Such comparison may be made by a conventional "and" circuit. If the two sets of signals (those over the line 272 and those over the line 273) agree then such agreement will cause signals to be sent over the line 269 to activate the "Relay Control" unit 274 for delivery of activating current over the line 275 to the power solenoid 69 of the lock unit, and thus produce the desired end operation of unlocking or otherwise.

Corresponding to the lock unit provided with such a coded responsive signal arrangement, we have shown, in FIGURE 30 a key unit capable of delivering to the key unit's crystal 276 correspondingly coded signals. In this case the crystal oscillator circuit 277 includes the transformer winding 278; and the secondary winding 279 is brought into circuitry 280 which includes the variable capacitor 280ª, and the variable resistor 281. By varying the values of these two elements the pulse rate (number of pulses per unit time) and the pulse duration (duration of "sustaining" each pulse) may both be regulated. By such regulation (either as a shop setting or by the guard or person using the key unit) such key unit may be calibrated to cause its crystal to deliver signals coded to match the code response setting of the lock unit elements shown in FIGURE 31. By such an arrangement a selected key unit may be used for individually activating the latch elements of a number of lock units having differently coded settings of their circuitry.

The key unit shown in FIGURE 23 includes the variable or adjustable resistor 282 and the variable or adjustable capacitor 283. By adjustments of these two elements the key unit may be caused to emit crystal physical vibrational pulses at various time spacings, and of various durations of the individual pulses.

In view of the extended explanation and description already given concerning various embodiments of our invention, the following statements respecting other embodiments will be readily understood, as respects their applicability to meet the conditions imposed by the basic functions to be produced.

In the key unit of FIGURE 21 we have made use of a vacuum tube triode with a cold cathode tube. This tube operates as an electronic gate. A main advantage in the use of a cold cathode tube is that such tube does not require heater current, this being a substantial advantage in the case of the key unit which is generally portable. In FIGURE 22 we have shown a lock unit using a cold cathode tube as a gate. By holding the input voltage just below the discharge level of the tube, any significant increase in input voltage or decrease of resistive load in the circuit will cause the tube to conduct. In this circuit the input voltage of the tube is controlled by the 10,000 ohm variable resistor. The cathode line is in series with the primary windings of a line transformer. The secondary side of the transformer is short coupled, at about 5 ohms, to a tuned crystal tank circuit. When the receiving crystal oscillates in the tuned circuit, the inductive load decreases, the grid voltage rises, and the tube conducts. This device can be made very rugged; it can be manufactured at relatively low cost, and has other advantages of construction and behavior.

The key unit shown in FIGURE 25 uses what may be called a variation of a "clapp" type circuit. The crystal acts as a frequency controller. In FIGURE 26 we have shown a transistorized lock unit. The operation of this circuit is as follows: The ultrasonic signal is fed to the input of a transistor where the A.C. component is rectified and amplified to an output of approximately 10 milliamperes output. This in turn connects to a power transistor which is held to near conduction. Across the transistor are the windings of the six volt D.C. relay. The contacts of the relay close the 110 volt A.C. supplying the power solenoid 69. When the detector transistor senses a high frequency signal it converts it to an amplified D.C. The power transistor in turn conducts and the relay closes. The relay makes the circuit to the power solenoid, 69.

In FIGURE 27 we have shown an embodiment of key unit wherein the one tube oscillator tunes a tank circuit into resonance with the crystal. This is sometimes called a Miller circuit. In FIGURE 28 we have shown a variation of the circuitry of FIGURE 27. In this embodiment the crystal is tuned with a parallel resonent choke coil.

In FIGURE 29 a Colpitts oscillator circuit is used, the frequency is varied by the 100 mmf. variable capacitor, or a trimmer capacitor can be sued to set the frequency at the desired value.

While we have at various points in the drawings and elsewhere given or shown values of various electronic and other components, and legended certain components, still it is noted that any and all such specific data are given or shown only by way of illustration; and we do not intend to limit ourselves to any specific value for components or other elements, except as we may do so in the claims to follow.

Crystals such as previously referred to herein are well adapted to use in the combinations hereinbefore described since they possess characteristics peculiarly adapted to meet the conditions imposed for use in such combinations. Some of these characteristics of such crystals which adapt them peculiarly to the uses herein contemplated are as follows:

A piezo-electric crystal has the property of converting mechanical motion or vibration into alternating current. Thus, such crystal, when vibrated at its fundamental resonant frequency may be used for electrically energizing or activating a response circuit in the lock unit, to produce the desired end result through use of relays or like elements controlling power solenoids or other elements of sufficient power conversion ability to operate the lock elements. Furthermore, every crystal, depending upon size and thickness (and geometry) will have a fundamental resonant frequency at which it will attain maximum oscillatory amplitude. The resonant point is very sharp and the current output sizeable in comparison to forced oscillations of the crystal, being oscillations at harmonics or other frequencies than its fundamental. Thus, a frequency detector utilizing a crystal can be made to respond only to the fundamental frequency of the crystal, and response to other frequencies, even to harmonics, may be avoided. Thus, too, the assurance that responses to unintended frequencies, will be avoided, with corresponding reliability of the lock unit in the sense that it can be caused to operate only upon receipt of frequencies of the fundamental resonance. As an example of the sensitivity of a crystal element such as may meet requirements of the present problem we may mention that if such a crystal is cut to resonate at a fundamental frequency of 50,000 c.p.s., it will respond to arriving frequencies from 49,950 to 50,050 c.p.s., being a sensitivity of 50 c.p.s. either side of the frequency of resonance, or a sensitivity either side, of 1/10 percent. However, the sensitivity of piezo-electric generation would in any case be a maximum at exact resonant frequency. Thus, by setting the relay controlled by such piezo-electric generation, to respond only at that crystal generated voltage of maximum value, there is assurance that relay response (to activate the lock elements) will occur only at substantially exact fundamental resonant frequency of the crystal of the lock unit. Thus, too, there is precluded the possibility of tripping the relay with spurious signals or off-frequency signals.

It is to be noted that although we have herein disclosed various forms of key unit in which the physically vibrational element of pre-determined frequency is a crystal or the like, insofar as concerns the activation of the lock unit, we also contemplate the use of key elements or units in which the physical vibration to be delivered to the proper portion of the lock unit housing is produced in other suitable manners than by crystals. Thus, we include in such key units, such devices as magnetostrictors, tuning forks, and other devices constituted or capable of producing frequencies of the matched frequencies to activate the various lock units, with such frequencies sustained longe enough to produce the necessary responses within such lock units, and of vibrational amplitudes sufficient to produce the necessary responses to effectively produce the needed sensing operation in the lock units.

Referring again to FIGURE 31, the line 285 extends from the unit 284 (legended "Input Attenuator and Amplifier") to the unit 267 (legended "Gating Pulse Generator"). This line 285 delivers synchronizing signals based on the received signals from the crystal 270, to such unit 267; so that, when such signals are received by the crystal 270, from the key unit, and such so-received signals agree as to coding with the coded signals produced by the unit 267, such signals from the two sources thus delivering over the two lines 272 and 273 to the "Gated Comparator" unit 268, will be drawn into phase (as well as being of corresponding coding and frequency). When such phase condition is established, so that the coded signals arriving at the unit 284 not only agree with the coded signals produced by the unit 267, both as to coding and frequency, but also as to phase relationship, then the unit 268 acts in manner to open its "gate" and permit signals to pass over the line 269 to the unit 274, thus activating the Latch Control element 275 for the intended lock operation.

We claim:

1. In a locking device including a housing of physical vibration transmitting material having a first movable locking element adapted to engage a companion element for the locking function, said first movable locking element having a first defined locking position and a second defined non-locking position, first driving means to urge said first movable locking element to move in direction towards said first defined locking position, second driving means to urge said first movable locking element to move in direction towards said second defined non-locking position, activating means to actuate one of said driving means, said activating means including means constituted to cause the driving means corresponding to said activating means to move the movable locking element in direction of urge of said driving means, said activating means including means to control the means which is constituted to cause the said driving means to move the movable locking element in said direction or urge effectively to cause said driving means to move the movable locking element in said direction of urge, said control means also including a physically vibrationable response element in physical engagement with the interior surface of the housing, said response element having a maximum amplitude of vibration when said vibrationable element is vibrated at its fundamental resonant frequency by vibration transmitted through said housing, and also including means responsive to said maximum amplitude physical vibrations of said vibrationable, element, said last named means comprising a portion of said control means.

2. A locking device as defined in claim 1, wherein the fundamental resonant frequency of said physically vibrationable element is a frequency above the audible frequency range.

3. A locking device as defined in claim 2, wherein the fundamental resonant frequency of said physically vibrationable element is in the range above substantially 18,000 c.p.s.

4. A locking device as defined in claim 2, wherein the fundamental resonant frequency of said physically vibrationable element is of the order of 40,000 c.p.s. to 60,000 c.p.s.

5. A locking device as defined in claim 4, wherein said physically vibrationable element has a maximum physically vibrational amplitude peaking within a range of substantially 50 c.p.s. from its fundamental resonant frequency.

6. A locking device as defined in claim 1, wherein the physically vibrationable element comprises a crystal.

7. A locking device as defined in claim 6, wherein said crystal is composed of barium titanates.

8. A locking device as defined in claim 6, wherein said crystal is composed of quartz.

9. A locking device as defined in claim 6, wherein said crystal is composed of Rochelle salts.

10. A locking device as defined in claim 1, wherein the locking device housing is formed of hard material.

11. A locking device as defined in claim 10, wherein said physically vibrationable element has a fundamental resonant frequency of upwards of 18,000 c.p.s., and wherein said housing at the location of physical engagement of the physically vibrationable element with the interior surface of the housing comprises a substantially flat area of uniform thickness of the housing in said area and is composed of material having the quality of propagation of said vibrations through said material from the exterior of the housing to the location of said physical engagement in a direction substantially normal to the surface at said location of physical engagement of the physically vibrationable element with said interior surface of the housing, and substantially without lateral dispersion of said vibrations in the material of the housing.

12. A locking device as defined in claim 1, together with key means to produce physical vibrations of the housing at a location in proximity to the location of physical engagement of the physically vibrationable response element with the interior surface of the housing, said physical vibration producing means including means removably engageable with the exterior surface of the housing opposite to the location of the physical engagement of the physically engageable vibrationable response element with the interior surface of the housing to produce the physical vibrations of the housing at said location and of a frequency substantially the same as the fundamental resonant frequency of said physical vibrationable response element.

13. A locking device as defined in claim 12, wherein said means which is removably engageable with the exterior surface of the housing includes a crystal element having a fundamental resonant frequency substantially the same as the fundamental resonant frequency of vibration of the physically vibrationable response element of the activating means aforesaid.

14. A locking device as defined in claim 13, wherein said crystal element is a piezo-electric element, together with means to deliver to said piezo-electric crystal electric impulses of frequency substantially the same as the fundamental resonant frequency of said crystal element.

15. A locking device as defined in claim 14, together with means to start and stop delivery of said electric impulses to said piezo-electric crystal.

16. A locking device as defined in claim 15, wherein said means to start and stop delivery of said electric impulses to said piezo-electric crystal is manual.

17. A locking device as defined in claim 14, wherein said activating means which includes means which is constituted to cause the driving means which corresponds to said activating means to move the movable element in direction of urge of said driving means, also includes signal selecting means responsive to a pre-selected timed sequence of code signals and non-responsive to signals other than said pre-selected timed sequence, and wherein said means to deliver to said piezo-electric crystal electric impulses of said frequency, also includes means to cause said electric impulses to be delivered to said crystal at said pre-selected timed sequence of said code.

18. A locking device as defined in claim 17, wherein said code of signals to which the signal selecting means of the control means of the activating means of the locking device, is responsive, includes pre-selected durations of the signals, and pre-selected time intervals between said pre-selected duration signals.

19. A locking device as defined in claim 14, wherein the fundamental resonant frequency of said piezo-electric crystal element varies with the temperature of said element, together with means to vary the frequency of the electric impulses delivered to said crystal with variations of temperature, said means comprising means to vary the frequency of said electric impulses delivered to the crystal by amounts substantially equal to the variations of the fundamental resonant frequency of the crystal, corresponding to said temperature variations.

20. A locking device as defined in claim 19, wherein the means to deliver to the piezo-electric crystal electric impulses includes electric oscillator means, and wherein the means to vary the frequency of said impulses comprises means to vary the reactance of a reactance element of said oscillator means and temperature responsive means in operative connection with said reactance varying means.

21. A locking device as defined in claim 12, wherein said activating means which includes means which is constituted to cause the driving means which corresponds to said activating means to move the movable element in direction of urge of said driving means, also includes signal selecting means responsive to a pre-selected timed sequence of code signals and non-responsive to signals other than said pre-selected timed sequence, and wherein said key means to produce the physical vibrations of the housing at said defined location includes means to cause the physical vibrations of the housing at said location to be produced at said pre-selected timed sequence of said code.

22. A locking device as defined in claim 12, wherein the exterior surface of the locking device housing at location substantially opposite to the location of engagement of the physically vibrationable response element with the interior surface of the locking device housing is provided with a key unit physically vibrationable element engagement receiving area.

23. A locking device as defined in claim 22, wherein the key unit physically vibrationable element engageable receiving area of the locking device housing is defined by a depression of the surface of the housing, said depression being of size and form to receive the key unit physically vibrationable element in firm physical engagement with the housing at said area.

24. A locking device as defined in claim 22, wherein the key unit engagement receiving area of the housing is defined by a visual distinctive marking.

25. A locking device as defined in claim 1, wherein the means to control the activating means includes a plurality of physically vibrationable response elements each having a maximum amplitude of vibration when such vibrationable element is vibrated at its fundamental resonant frequency, the fundamental resonant frequencies of the physically vibrationable elements being different, and said activating means also including means corresponding to each of said physically vibrationable elements and responsive to the maximum amplitude physical vibrations of the physically vibrationable element to which it corresponds, each of said means which corresponds to a physically vibrationable element having an operating position corresponding to vibration of its physically vibrationable element at the fundamental resonant frequency of said element and a non-operating position corresponding to the non-vibration of its physically vibrationable element at such frequency, and operative connections from the operating positions of each of said means which corresponds to a physically vibrationable element, to the control means of the activating means, said operative connections last named being constituted for locking element movement when both of the means which are responsive to maximum amplitude vibration of the corresponding physically vibrationable element are in their operating positions.

26. A locking device as defined in claim 25, wherein the operative connections from the operating positions of each of said means which corresponds to a physically vibrationable element to the control means of the activating means comprises a series circuit including all of said operating positions.

27. A locking device as defined in claim 25, wherein each of said physically vibrationable response elements is in physical engagement with the interior surface of said housing, and key means to produce physical vibrations of the housing at locations in proximity to the locations of physical engagement of the physically vibrationable response elements with the interior surface of the housing, said physical vibration producing means corresponding to each of the vibrationable response elements including means to produce the physical vibrations of the housing at the location of physical engagement of the corresponding vibrationable response element with the interior of the housing, substantially at the fundamental resonant frequency of the corresponding vibrationable response element.

28. A locking device as defined in claim 27, wherein the frequencies of all of the vibrationable response elements of the locking device are upwards of 18,000 c.p.s., and wherein the housing at the locations of the physical engagement of the physically vibrationable response elements with such housing interior surface comprises hard material.

29. In a locking device including a housing of physical vibration transmitting material having a first movable locking element adapted to engage a companion element for the locking function, said first movable locking element having a first defined locking position and a second defined non-locking position, first driving means to urge said first movable locking element to move in direction toward said first defined locking position, second driving means to urge said first movable locking element to move in direction towards said second defined non-locking position, activating means to activate one of said driving means, said activating means including means constituted to cause the driving means corresponding to said activating means to move the movable locking element in direction of urge of said driving means, said activating means including means to control the means which is constituted to cause the said driving means to move the movable locking element in said direction of urge effectively to cause said driving means to move the movable locking element in said direction of urge, said control means also including a physically vibrationable response element in physical engagement with the interior surface of the housing, said response element having a maximum amplitude of vibration when said vibrationable element is vibrated at its fundamental resonant frequency by vibration transmitted through said housing, and also including means responsive to said maximum amplitude physical vibrations of said vibrationable element, said last named means comprising a portion of said control means, said means which is responsive to said maximum amplitude physical vibrations of said vibrationable element including electrically actuated elements, connections for supply of current to said electrically actuated elements, a key unit corresponding to said locking device, said key unit including a key unit physical vibration element of surface contour for physical vibration transmission engagement with the exterior surface of the locking device housing at location substantially opposite to the location of engagement of the physically vibrationable response element with the interior surface of the locking device housing, said key unit including vibrationable means having a fundamental resonant frequency substantially the same as the fundamental resonant frequency of the physically vibrationable response element of the locking device, said key unit including electrical supply connections and circuitry constituted to produce electrical oscillations at frequency substantially the same as the fundamental resonant frequency of the physically vibrationable element of the key unit, and circuit connections to deliver said oscillations to said key unit physically vibrationable element.

30. A locking device as defined in claim 29, wherein the current supply to the electrically actuated elements of the locking device, and the connections for supply of current to the key unit circuitry, are both of the same type of current, together with means to supply power from the connections which supply current to the electrically actuated elements of the locking device, to the connections which supply current to the key unit circuitry, said connections including a power delivery element in the locking device housing in connection with the connections which supply current to the electrically actuated elements of the locking device, and including a power receiving element in the key unit, in connection with the connections which supply current to the key unit circuitry, said power receiving element of the key pnit and the physically vibrationable element of the key unit which is movable into physical engagement with the key unit proximate surface vibrationable element receiving area of the locking device housing being located in said key unit at locations for engagement of the key unit physically vibrationable element with said element engagement receiving portion of the locking device housing, and engagement of the power receiving element of the key unit with the power delivering element which is in the locking device housing, simultaneously.

31. A locking device as defined in claim 30, wherein both the current supply to the electrically actuated elements of the locking device, and the connections for supply of current to the key unit circuitry, are A.C., wherein the means to supply power for the connections which supply current to the electrically actuated elements of the locking device, are constituted for transfer of alternating current power, and wherein the power delivery element in the locking device housing and the power receiving element in the key unit, comprise A.C. power transferring elements.

32. A locking device as defined in claim 31, wherein the power delivery element in the locking device housing comprises a core of a transformer unit, and wherein the power receiving element in the key unit comprises the secondary winding of such transformer, and wherein the primary winding of such transformer is in electrical connection with the connections which supply current to the electrically actuated elements of the locking device.

33. A locking device as defined in claim 32, wherein the power receiving element of the key unit includes a core for said secondary winding, and wherein the power delivery element core is located in position for engagement by the key unit core when the key unit physically vibrationable element is engaged with the engagement receiving portion of the partition.

34. In a locking device including a housing of physical vibration transmitting material having a first movable locking element adapted to engage a companion element for the locking function, said first movable locking element having a first defined locking position and a second defined non-locking position, first driving means to urge said first movable locking element to move in direction towards said first defined locking position, second driving means to urge said first movable locking element to move in direction towards said second defined non-locking position, together with means to activate one of said driving means, said activating means including means to control said driving means effectively to cause the movable locking element to move towards said defined position which corresponds to said driving means, said activating means also including a physically vibrationable response element having a maximum amplitude of vibration when said vibrationable element is vibrated at its fundamental resonant frequency, and also including means responsive to said maximum amplitude physical vibration of said vibrationable element, said last named means comprising a portion of said means to control said driving means, and key means to produce physical vibrations of said first defined physically vibrationable response element, said key means including physical vibration producing means of a frequency substantially the same as the fundamental resonant frequency of said physically vibrationable response element, said key means being movable into an operative position wherein a portion of said key means physical vibration producing means is in solid physical vibration transmitting engagement with a portion of the physically vibrationable response element, and also being removable from such operative position last defined.

35. A locking device as defined in claim 34, wherein said key means physically vibrationable resonant element produces physical vibrations of sustained duration.

36. In a locking device having a first movable locking element adapted to engage a companion element for the locking function, said first movable locking element having a first defined locking position and a second defined non-locking position, first driving means to urge said first movable locking element to move in direction towards said first defined locking position, second driving means to urge said first movable locking element to move in direction towards said second defined non-locking position, activating means to activate one of said driving means, said activating means including means constituted to cause the driving means corresponding to said activating means to move the movable locking element in direction of urge of said driving means, said activating means including means to control the means which is constituted to cause the said driving means to move the movable locking element in said direction of urge effectively to cause said driving means to move the movable locking element in said direction of urge, said control means also including a physically vibrationable response element, a sensing plate of physical vibration transmitting material in physical engagement with said physically vibrationable response element, said response element having a maximum amplitude of vibration when said vibrationable element is vibrated at its fundamental resonant frequency by vibrations transmitted through said sensing plate, and also including means responsive to said maximum amplitude physical vibrations of said vibrationable element, said last named means comprising a portion of said control means, key means including means to produce physical vibrations of the sensing plate surface opposite to the location of physical engagement of the physically vibrationable response element with such sensing plate, by physical engagement of such key means physical vibration producing element, with the surface of the sensing plate at such location opposite to the physical engagement of the vibrationable response element with the sensing plate, together with means comprising a portion of the key means constituted to cause the key means physical vibration producing means to vibrate at a frequency substantially the same as the fundamental resonant frequency of the vibrationable response element.

37. A key unit for a lock unit of the type which includes a lock element having a first defined locking position and a second defined non-locking position, and which lock unit includes means to actuate said lock element to one of said positions, and which lock unit further includes a physically vibrational response element having a fundamental resonant frequeuncy, the lock unit further including a physical vibration transmitting element in physical vibration transmitting engagement with the physically vibrational response element of the lock unit, and which lock unit includes connections between the physically vibrational response element and the lock element actuating means, constituted to cause the actuating means to actuate the lock element to one of said defined positions when the physically vibrational response element is vibrated at its resonant frequency; said key unit including a physical vibration producing element having a fundamental resonant frequency substantially the same as the fundamental resonant frequency of the lock unit physically vibrational response element, said key unit also including a part in physical vibration transmitting engagement with the physical vibration producing element of the key unit, said part having a contour constituted for physical vibration transmitting engagement with the physical vibration receiving element of the lock unit, and means to cause the physical vibration producing element of the key unit to produce sustained vibrations of substantially the same frequency as the fundamental resonant frequency of the physically vibrational producing element of said key unit.

38. In a locking device having a movable locking element adapted to engage a companion element for the locking function, said movable locking element having a first defined locking position and a second defined non-locking position, first means to move said movable locking element towards said first defined locking position, electrical power operated second means to move said movable locking element towards said second defined non-locking position, current supply connections, means to deliver current from said supply connections to said electrical power operated second means, said current delivering means including switching means having a current delivery position and a current non-delivery position, manually controlled means to actuate said switching means, third means to move said movable locking element towards said second defined non-locking position, said third means comprising a manual key-operated unit having a movable key actuated element movable between a movable door locking element operating position and a movable door locking element non-locking position, operative connections between said key operated element and the movable door locking element constituted for movement of said movable door locking element to its second defined non-locking position when the movable key-operated element is in its movable door locking element non-locking position, said movable key-operated element having a key-receiving operating part, a movable shutter, means to support said shutter for movement with respect to the key-receiving operating part of said movable key-operated element, between a first shutter position of non-obstruction of the key receiving part and a second shutter position of obstruction of the key receiving part, spring means urging movement of the shutter to said first shutter position, electrically operative means to move the shutter to said second shutter position, said electrically operative means being constituted for retain of the shutter in said second shutter position during supply of current to said electrically operative means, and the spring means being constituted for movement of the shutter to said first shutter position during non-supply of current to said electrically operative means, together with means to deliver current from said first defined current supply connections to said electrically operative means which moves the shutter to said second shutter key receiving part obstructing position.

39. Locking means as defined in claim 38, wherein the shutter is pivotally mounted to a stationary part in position for swinging movement with respect to the key-receiving operating part of the movable key-operated element, and wherein the first shutter position comprises a swung position of said shutter into non-alignment with said key receiving operating part, and wherein the second shutter position comprises another swung position of said shutter into alignment with said key-receiving operating part.

40. Locking means as defined in claim 39, wherein said spring means constantly urges swing of the shutter to said first defined shutter position, and wherein said electrically operative means is constituted for movement of the shutter to said second defined shutter position against the urge of said spring.

References Cited in the file of this patent
UNITED STATES PATENTS

| | | |
|---|---|---|
| 656,341 | Carleton | Aug. 21, 1900 |
| 745,506 | Manifold | Dec. 1, 1903 |
| 1,756,000 | Miller | Apr. 22, 1930 |
| 1,864,368 | Nicolson | June 21, 1932 |
| 1,869,829 | Skellett et al. | Aug. 2, 1932 |
| 1,931,028 | Marrison | Oct. 17, 1933 |
| 2,153,088 | Knell | Apr. 4, 1939 |
| 2,441,570 | Glessner | May 18, 1948 |
| 2,507,253 | Howatt | May 9, 1950 |
| 2,509,345 | Howell et al. | May 30, 1950 |
| 2,517,975 | Chapin | Aug. 8, 1950 |